(12) United States Patent
Kidani

(10) Patent No.: US 12,501,054 B2
(45) Date of Patent: Dec. 16, 2025

(54) IMAGE DECODING DEVICE, IMAGE DECODING METHOD, AND PROGRAM

(71) Applicant: KDDI CORPORATION, Tokyo (JP)

(72) Inventor: Yoshitaka Kidani, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 9 days.

(21) Appl. No.: 18/441,354

(22) Filed: Feb. 14, 2024

(65) Prior Publication Data

US 2024/0187606 A1 Jun. 6, 2024

Related U.S. Application Data

(63) Continuation of application No. PCT/JP2022/029749, filed on Aug. 3, 2022.

(30) Foreign Application Priority Data

Aug. 19, 2021 (JP) ................. 2021-134433

(51) Int. Cl.
*H04N 19/159* (2014.01)
*H04N 19/119* (2014.01)
*H04N 19/176* (2014.01)
*H04N 19/70* (2014.01)

(52) U.S. Cl.
CPC ......... *H04N 19/159* (2014.11); *H04N 19/119* (2014.11); *H04N 19/176* (2014.11); *H04N 19/70* (2014.11)

(58) Field of Classification Search
CPC .... H04N 19/119; H04N 19/159; H04N 19/70; H04N 19/176; H04N 19/593; H04N 19/52
See application file for complete search history.

(56) References Cited

U.S. PATENT DOCUMENTS

| | | | | |
|---|---|---|---|---|
| 11,665,018 B2* | 5/2023 | Peng | ................. | H04L 12/40169 710/105 |
| 12,155,826 B2* | 11/2024 | Lee | ....................... | H04N 19/119 |
| 12,160,574 B2* | 12/2024 | Chang | .................. | H04N 19/139 |
| 2022/0321890 A1* | 10/2022 | Lim | ...................... | H04N 19/137 |
| 2022/0400257 A1* | 12/2022 | Chang | .................. | H04N 19/573 |

FOREIGN PATENT DOCUMENTS

WO  WO-2023021988 A1 * 2/2023  ........... H04N 19/119

OTHER PUBLICATIONS

International Search Report (ISR) (and an English language translation thereof) dated Oct. 25, 2022, issued in International Application No. PCT/JP2022/029749.
Written Opinion dated Oct. 25, 2022, issued in International Application No. PCT/JP2022/029749.
(Continued)

*Primary Examiner* — Tsion B Owens
(74) *Attorney, Agent, or Firm* — Holtz, Holtz & Volek PC

(57) ABSTRACT

An image decoding device according to the present invention includes a circuit, wherein the circuit controls decoding of syntax that specifies whether or not merge with motion vector difference is applied to a partitioned region 0, which is partitioned in a geometric partitioning mode of a decoding target block, in accordance with a value of syntax that specifies whether or not a prediction mode of the partitioned region 0 is an intra prediction mode.

3 Claims, 26 Drawing Sheets

(56) References Cited

OTHER PUBLICATIONS

"ITU-T H.266 Versatile Video Coding", Series H: Audiovisual and Multimedia Systems; Infrastructure of audiovisual services—Coding of moving video, 7.3.2.4 Sequence parameter set RBSP syntax, 7.3.11.7 Merge data syntax, Aug. 2020.

Blaser, et al., "Description of SDR and 360° video coding technology proposal by RWTH Aachen University", Joint Video Experts Team (JVET) of ITU-T SG 16 WP 3 and ISO/IEC JTC 1/SC 29/WG 11. JVET-J0023-v1, 10th Meeting: San Diego. US. Apr. 2018. pp. 1-14.

Kidani, et al., "AHG12: Gpm with inter and intra prediction", Joint Video Experts Team (JVET) of ITU-T SG 16 WP 3 and ISO/IEC JTC 1/SC 29. JVET-W0110-v2. 23rd Meeting, by teleconference. Jul. 2021. pp. 1-3.

Kidani, et al., "EE2-3.1: GPM with inter and intra prediction", Joint Video Experts Team (JVET) of ITU-T SG 16 WP 3 and ISO/IEC JTC 1/SC 29. JVET-Y0065. 25th Meeting, by teleconference. Jan. 2022. pp. 1-5.

Seregin, et al., "EE2: Summary Report on Enhanced Compression beyond VVC capability", Joint Video Experts Team (JVET) of ITU-T SG 16 WP 3 and ISO/IEC JTC 1/SC 29. JVET-W0024-v2, 23rd Meeting, by teleconference. Jul. 2021. pp. 1-12.

\* cited by examiner

IMAGE DECODING DEVICE, IMAGE DECODING METHOD, AND PROGRAM

CROSS-REFERENCE TO RELATED APPLICATIONS

The present application is a continuation of PCT Application No. PCT/JP2022/029749, filed on Aug. 3, 2022, which claims the benefit of Japanese patent application No. 2021-134433 filed on Aug. 19, 2021, the entire contents of which are incorporated herein by reference in its entirety.

TECHNICAL FIELD

The present invention relates to an image decoding device, an image decoding method, and a program.

BACKGROUND ART

Non Patent Literature 1 discloses a geometric partitioning mode (GPM).

The GPM diagonally divides a rectangular block into two and performs motion compensation on each of the two blocks. Specifically, in the GPM, each of the two partitioned regions is motion-compensated by a motion vector in a merge mode, and is blended by weighted averaging. As the oblique partitioning pattern, sixty-four patterns are prepared according to the angle and the displacement.

CITATION LIST

Non Patent Literature

Non Patent Literature 1: ITU-T H.266/VVC
Non Patent Reference 2: JVET-W0024, "EE2: Summary Report on Enhanced Compression beyond VVC capability"

SUMMARY OF INVENTION

However, since the GPM disclosed in Non Patent Literature 1 is limited to the merge mode, there is a problem that there is room for improvement in coding performance.

The present invention, therefore, has been made in view of the above-described problem, and an object thereof is to provide an image decoding device, an image decoding method, and a program that can expect further improvement in coding performance in a GPM since a required code amount is reduced as compared with objective image quality improvement by a GPM by prohibiting a GPM including two different intra prediction modes with low selectivity when intra prediction modes are added to the GPM.

A first feature of the present invention is an image decoding device including a decoding unit configured to decode first syntax that controls applicability of a geometric partitioning mode of a decoding target sequence and control, in accordance with a value of the first syntax, whether or not to decode second syntax that controls applicability of an intra prediction mode to the geometric partitioning mode of the decoding target sequence. The decoding unit is configured to not decode, in a case where a first internal parameter that controls applicability of the geometric partitioning mode of the decoding target block is valid, a value of the second syntax is 1, and third syntax that specifies whether or not a prediction mode of a partitioned region 0 partitioned in the geometric partitioning mode of the decoding target block is the intra prediction mode is valid, fourth syntax that specifies whether or not a prediction mode of a partitioned region 1 partitioned in the geometric partitioning mode of the decoding target block is the intra prediction mode, configured to decode the fourth syntax in a case where the third syntax is not valid and a slice type to which the decoding target block belongs is a B-slice, configured to not decode the fourth syntax in a case where the slice type to which the decoding target block belongs is not a B-slice, and configured to not decode the fourth syntax in a case where a condition that the first internal parameter be valid and the value of the second syntax be 1 is not satisfied.

A second feature of the present invention is an image decoding device including a decoding unit configured to decode first syntax that controls applicability of a geometric partitioning mode of a decoding target sequence and control, in accordance with a value of the first syntax, whether or not to decode second syntax that controls applicability of an intra prediction mode to the geometric partitioning mode of the decoding target sequence. The decoding unit is configured to decode, in a case where there are two or more types of intra prediction mode applicable to the geometric partitioning mode of the decoding target block and a value of third syntax that specifies whether or not a prediction mode of a partitioned region 0 partitioned in the geometric partitioning mode of the decoding target block is the intra prediction mode is 1, an index that controls a type of intra prediction mode added to the geometric partitioning mode of the decoding target block and specifies the intra prediction mode of the partitioned region 0, configured to decode, in a case where the value of the third syntax is not 1 and a value of a second internal parameter indicating a maximum number of merge candidates for the decoding target block is larger than 1, a merge index for the partitioned region 0 and specify merge candidates for the partitioned region 0, and configured to not decode, in a case where the value of the second internal parameter is smaller than or equal to 1, the merge index for the partitioned region 0 and specify the merge candidates for the partitioned region 0.

A third feature of the present invention is an image decoding device including a decoding unit configured to decode first syntax that controls applicability of a geometric partitioning mode of a decoding target sequence and control, in accordance with a value of the first syntax, whether or not to decode second syntax that controls applicability of an intra prediction mode to the geometric partitioning mode of the decoding target sequence. The decoding unit is configured to decode, in a case where there are two or more types of intra prediction mode applicable to the geometric partitioning mode of the decoding target block and a value of third syntax that specifies whether or not a prediction mode of a partitioned region 0 partitioned in the geometric partitioning mode of the decoding target block is the intra prediction mode is 1, a merge index for a partitioned region 1 partitioned in the geometric partitioning mode of the decoding target block and specify merge candidates for the partitioned region 1, configured to decode, in a case where the value of the third syntax is not 1 and a value of fourth syntax that specifies whether or not a prediction mode of the partitioned region 1 is the intra prediction mode is 1, an index that controls a type of intra prediction mode added to the geometric partitioning mode of the decoding target block and specify the intra prediction mode of the partitioned region 1, configured to decode, in a case where the value of the fourth syntax is not 1 and a value of a second internal parameter indicating a maximum number of merge candidates for the decoding target block is larger than 2, a merge index for the partitioned region 1 and specify the merge candidates for the partitioned region 1, and configured to decode, in a case where the value of the second internal parameter is smaller than or equal to 2, the merge index for the partitioned region 1 and specify the merge candidates for the partitioned region 1.

A fourth feature of the present invention is an image decoding device including a decoding unit configured to decode a first syntax that controls applicability of a geometric partitioning mode of a decoding target sequence and control, in accordance with a value of the first syntax, whether or not to decode second syntax that controls applicability of an intra prediction mode to the geometric partitioning mode of the decoding target sequence. The decoding unit is configured to control, in accordance with a value of third syntax that specifies whether or not a prediction mode of a partitioned region 0 partitioned in the geometric partitioning mode of the decoding target block is the intra prediction mode, decoding of fifth syntax that specifies whether or not to apply merge with motion vector difference to the partitioned region 0.

A fifth feature of the present invention is an image decoding device including a decoding unit configured to decode a first syntax that controls applicability of a geometric partitioning mode of a decoding target sequence and control, in accordance with a value of the first syntax, whether or not to decode second syntax that controls applicability of an intra prediction mode to the geometric partitioning mode of the decoding target sequence. The decoding unit is configured to control, in accordance with a value of fourth syntax that specifies whether or not a prediction mode of a partitioned region 1 partitioned in the geometric partitioning mode of the decoding target block is the intra prediction mode, decoding of sixth syntax that specifies whether or not to apply merge with motion vector difference to the partitioned region 1.

A sixth feature of the present invention is an image decoding device including a decoding unit configured to decode a first syntax that controls applicability of a geometric partitioning mode of a decoding target sequence and control, in accordance with a value of the first syntax, whether or not to decode second syntax that controls applicability of an intra prediction mode to the geometric partitioning mode of the decoding target sequence. The decoding unit is configured to control, in accordance with a value of a first internal parameter that controls applicability of the geometric partitioning mode of the decoding target block, decoding of fifth syntax that specifies whether or not to apply merge with motion vector difference to a partitioned region 0 partitioned in the geometric partitioning mode of the decoding target block. The decoding unit is configured to control, in accordance with the value of the first internal parameter, decoding of sixth syntax that specifies whether or not to apply the merge with motion vector difference to a partitioned region 1 partitioned in the geometric partitioning mode of the decoding target block.

A seventh feature of the present invention is an image decoding device including a decoding unit configured to decode a first syntax that controls applicability of a geometric partitioning mode of a decoding target sequence and control, in accordance with a value of the first syntax, whether or not to decode second syntax that controls applicability of an intra prediction mode to the geometric partitioning mode of the decoding target sequence. The decoding unit is configured to control, in accordance with a value of the second syntax and a value of fifth syntax that specifies whether or not to apply merge with motion vector difference to a partitioned region 0 partitioned in the geometric partitioning mode of the decoding target block, decoding of third syntax that specifies whether or not to apply the intra prediction mode to the partitioned region 0.

An eighth feature of the present invention is an image decoding device including a decoding unit configured to decode a first syntax that controls applicability of a geometric partitioning mode of a decoding target sequence and control, in accordance with a value of the first syntax, whether or not to decode second syntax that controls applicability of an intra prediction mode to the geometric partitioning mode of the decoding target sequence. The decoding unit is configured to control, in accordance with a value of the second syntax and a value of sixth syntax that specifies whether or not to apply merge with motion vector difference to a partitioned region 1 partitioned in the geometric partitioning mode of the decoding target block and a value of third syntax that specifies whether or not a prediction mode of a partitioned region 0 partitioned in the geometric partitioning mode of the decoding target block is the intra prediction mode, decoding of fourth syntax that specifies whether or not to apply the intra prediction mode to the partitioned region 1.

A ninth feature of the present invention is an image decoding device including a decoding unit configured to decode a first syntax that controls applicability of a geometric partitioning mode of a decoding target sequence and control, in accordance with a value of the first syntax, whether or not to decode second syntax that controls applicability of an intra prediction mode to the geometric partitioning mode of the decoding target sequence. The decoding unit is configured to control, in accordance with a value of fifth syntax that specifies whether or not to apply merge with motion vector difference to a partitioned region 0 partitioned in the geometric partitioning mode of the decoding target block and a value of sixth syntax that specifies whether or not to apply the merge with motion vector difference to a partitioned region 1 partitioned in the geometric partitioning mode of the decoding target block, decoding of eleventh syntax that specifies whether or not to apply template matching to the partitioned region 0 and the partitioned mode 1.

A tenth feature of the present invention is an image decoding device including a decoding unit configured to decode a first syntax that controls applicability of a geometric partitioning mode of a decoding target sequence and control, in accordance with a value of the first syntax, whether or not to decode second syntax that controls applicability of an intra prediction mode to the geometric partitioning mode of the decoding target sequence. The decoding unit is configured to control, in accordance with a value of third syntax that specifies whether or not a prediction mode of a partitioned region 0 partitioned in the geometric partitioning mode of the decoding target block is the intra prediction mode, decoding of sixth syntax that specifies whether or not to apply merge with motion vector difference to the partitioned region 1.

An eleventh feature of the present invention is an image decoding device including a decoding unit configured to decode a first syntax that controls applicability of a geometric partitioning mode of a decoding target sequence and control, in accordance with a value of the first syntax, whether or not to decode second syntax that controls applicability of an intra prediction mode to the geometric partitioning mode of the decoding target sequence. The decoding unit is configured to control, in accordance with a value of a first internal parameter that controls applicability of the geometric partitioning mode of the decoding target block, a value of the second syntax, a value of third syntax that specifies whether or not a prediction mode of a partitioned region 0 partitioned in the geometric partitioning mode of the decoding target block is the intra prediction mode, and a value of fifth syntax that specifies whether or not to apply merge with motion vector difference to the partitioned region 0, decoding of fourth syntax that specifies whether or not a prediction mode of a partitioned region 1 partitioned in the geometric partitioning mode of the decoding target block is the intra prediction mode.

A twelfth feature of the present invention is an image decoding device including a decoding unit configured to decode a first syntax that controls applicability of a geometric partitioning mode of a decoding target sequence and control, in accordance with a value of the first syntax, whether or not to decode second syntax that controls applicability of an intra prediction mode to the geometric partitioning mode of the decoding target sequence. The decoding unit is configured to control, in accordance with a value of third syntax that specifies whether or not a prediction mode of a partitioned region 0 partitioned in the geometric partitioning mode of the decoding target block is the intra prediction mode and a value of fourth syntax that specifies whether or not a prediction mode of a partitioned region 1 partitioned in the geometric partitioning mode of the decoding target block is the intra prediction mode or a value of fifth syntax that specifies whether or not to apply merge with motion vector difference to the partitioned region 0 and a value of sixth syntax that specifies whether or not to apply the merge with motion vector difference to the partitioned region 1, decoding of eleventh syntax that specifies whether or not to apply template matching to the partitioned region 0 and the partitioned region 1.

A thirteenth feature of the present invention is an image decoding method including the steps of decoding first syntax that controls applicability of a geometric partitioning mode of a decoding target sequence, controlling, in accordance with a value of the first syntax, whether or not to decode second syntax that controls applicability of an intra prediction mode to the geometric partitioning mode of the decoding target sequence, not decoding, in a case where a first internal parameter that controls applicability of the geometric partitioning mode of the decoding target block is valid, a value of the second syntax is 1, and third syntax that specifies whether or not a prediction mode of a partitioned region 0 partitioned in the geometric partitioning mode of the decoding target block is the intra prediction mode is valid, fourth syntax that specifies whether or not a prediction mode of a partitioned region 1 partitioned in the geometric partitioning mode of the decoding target block is the intra prediction mode, decoding the fourth syntax in a case where the third syntax is not valid and a slice type to which the decoding target block belongs is a B-slice, not decoding the fourth syntax in a case where the slice type to which the decoding target block belongs is not a B-slice, and not decoding the fourth syntax in a case where a condition that the first internal parameter be valid and the value of the second syntax be 1 is not satisfied.

A fourteenth feature of the present invention is a program causing a computer to function as an image decoding device. The image decoding device includes a decoding unit configured to decode first syntax that controls applicability of a geometric partitioning mode of a decoding target sequence and control, in accordance with a value of the first syntax, whether or not to decode second syntax that controls applicability of an intra prediction mode to the geometric partitioning mode of the decoding target sequence. The decoding unit is configured to not decode, in a case where a first internal parameter that controls applicability of the geometric partitioning mode of the decoding target block is valid, a value of the second syntax is 1, and third syntax that specifies whether or not a prediction mode of a partitioned region 0 partitioned in the geometric partitioning mode of the decoding target block is the intra prediction mode is valid, fourth syntax that specifies whether or not a prediction mode of a partitioned region 1 partitioned in the geometric partitioning mode of the decoding target block is the intra prediction mode, configured to decode the fourth syntax in a case where the third syntax is not valid and a slice type to which the decoding target block belongs is a B-slice, configured to not decode the fourth syntax in a case where the slice type to which the decoding target block belongs is not a B-slice, and configured to not decode the fourth syntax in a case where a condition that the first internal parameter be valid and the value of the second syntax be 1 is not satisfied.

According to the present invention, it is possible to provide an image decoding device, an image decoding method, and a program that can expect further improvement in coding performance in a GPM since a required code amount is reduced as compared with objective image quality improvement by a GPM by prohibiting a GPM including two different intra prediction modes with low selectivity when intra prediction modes are added to the GPM.

DESCRIPTION OF EMBODIMENTS

An embodiment of the present invention will be described hereinbelow with reference to the drawings. Note that the constituent elements of the embodiment below can, where appropriate, be substituted with existing constituent elements and the like, and that a wide range of variations, including combinations with other existing constituent elements, is possible. Therefore, there are no limitations placed on the content of the invention as in the claims on the basis of the disclosures of the embodiment hereinbelow.

First Embodiment

Figure 1:
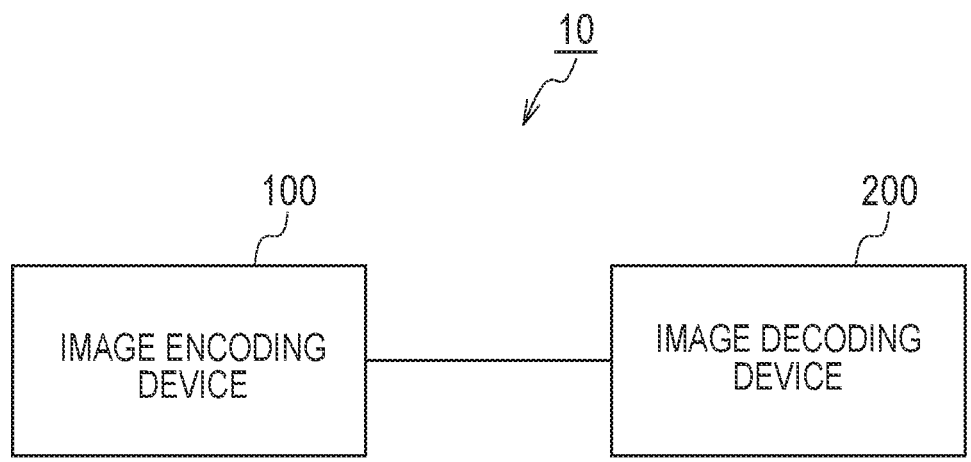
FIG. 1 is a diagram illustrating an example of a configuration of an image processing system 1 according to an embodiment.

Hereinafter, an image processing system 10 according to a first embodiment of the present invention will be described with reference to FIGS. 1 to 26. FIG. 1 is a diagram illustrating the image processing system 10 according to the present embodiment.

(Image Processing System 100)

As illustrated in FIG. 1, the image processing system 10 according to the present embodiment includes an image coding device 100 and an image decoding device 200.

The image coding device 100 is configured to generate coded data by coding an input image signal (picture). The image decoding device 200 is configured to generate an output image signal by decoding the coded data.

The coded data may be transmitted from the image coding device 100 to the image decoding device 200 via a transmission path. The coded data may be stored in a storage medium and then provided from the image coding device 100 to the image decoding device 200.

(Image Coding Device 100)

Figure 2:
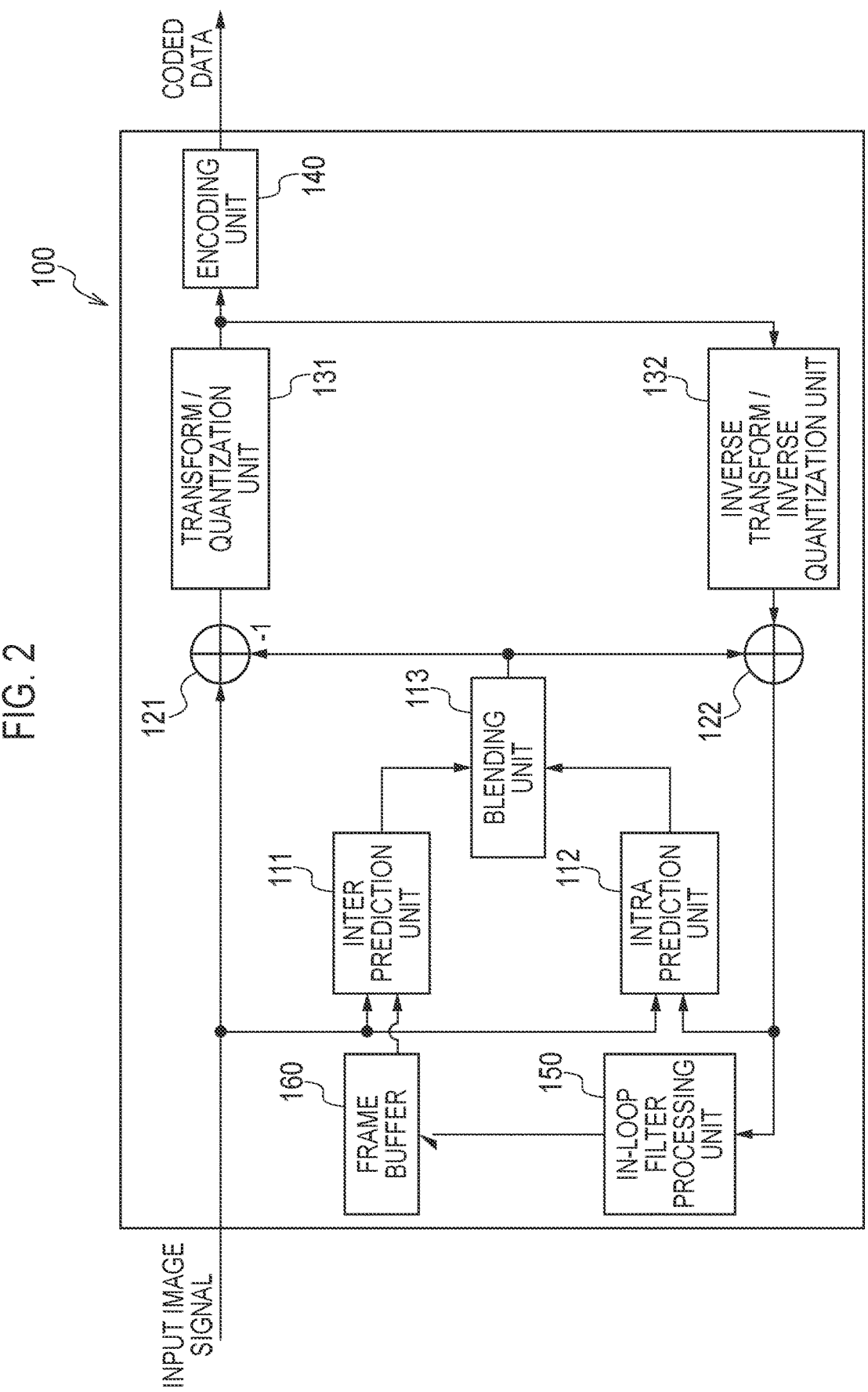
FIG. 2 is a diagram illustrating an example of functional blocks of an image encoding device 100 according to an embodiment.

Hereinafter, the image coding device 100 according to the present embodiment will be described with reference to FIG. 2. FIG. 2 is a diagram illustrating an example of functional blocks of the image coding device 100 according to the present embodiment.

As shown in FIG. 2, the image coding device 100 includes an inter prediction unit 111, an intra prediction unit 112, a subtractor 121, an adder 122, a transform/quantization unit 131, an inverse transform/inverse quantization unit 132, a coding unit 140, an in-loop filtering processing unit 150, and a frame buffer 160.

The inter prediction unit 111 is configured to generate a prediction signal by inter prediction (inter-frame prediction).

Specifically, the inter prediction unit 111 is configured to specify a reference block included in a reference frame by comparing a frame to be coded (hereinafter, referred to as a target frame) with the reference frame stored in the frame buffer 160, and determine a motion vector (mv) for the specified reference block. Here, the reference frame is a frame different from the target frame.

The inter prediction unit 111 is configured to generate the prediction signal included in a block to be coded (hereinafter, referred to as a target block) for each target block based on the reference block and the motion vector.

The inter prediction unit 111 is configured to output the inter prediction signal to blending unit 113.

Although not illustrated in FIG. 2, the inter prediction unit 111 is configured to output information related to inter prediction control (specifically, information such as an inter prediction mode, a motion vector, a reference frame list, and a reference frame number) to the encoding unit 140.

The intra prediction unit 112 is configured to generate a prediction signal by intra prediction (intra-frame prediction).

Specifically, the intra prediction unit 112 is configured to specify the reference block included in the target frame, and generate the prediction signal for each target block based on the specified reference block. Here, the reference block is a block referred to for the target block. For example, the reference block is a block adjacent to the target block.

Furthermore, the intra prediction unit 112 is configured to output the intra prediction signal to the blending unit 113.

Furthermore, although not illustrated in FIG. 2, the intra prediction unit 112 is configured to output information (specifically, information such as an intra prediction mode) regarding control of intra prediction to the encoding unit 140.

The blending unit 113 is configured to blend the inter prediction signal input from the inter prediction unit 111 and/or the intra prediction signal input from the intra prediction unit 112 using a preset weighting factor, and output the blended prediction signal (hereinafter, collectively referred to as a prediction signal) to the subtractor 121 and the adder 122.

Here, regarding the blending processing of the inter prediction signal and/or the intra prediction signal by the blending unit 113, the same configuration as that of Non Patent Literature 1 can be adopted in the present embodiment, and thus the description thereof will be omitted.

The subtractor 121 is configured to subtract the prediction signal from the input image signal, and output a prediction residual signal to the transform/quantization unit 131. Here, the subtractor 121 is configured to generate the prediction residual signal that is a difference between the prediction signal generated by intra prediction or inter prediction and the input image signal.

The adder 122 is configured to add the prediction signal output from the blending unit 113 to the prediction residual signal output from the inverse transform/inverse quantization unit 132 to generate a decoded signal before filtering, and output the decoded signal before filtering to the intra prediction unit 112 and the in-loop filter processing unit 150.

Here, the pre-filtering decoded signal constitutes the reference block used by the intra prediction unit 112.

The transform/quantization unit 131 is configured to perform transform processing for the prediction residual signal and acquire a coefficient level value.

Furthermore, the transform/quantization unit 131 may be configured to perform quantization of the coefficient level value.

Here, the transform processing is processing of transforming the prediction residual signal into a frequency component signal. In such transform processing, a base pattern (transformation matrix) corresponding to discrete cosine transform (Hereinafter referred to as DCT) may be used, or a base pattern (transformation matrix) corresponding to discrete sine transform (Hereinafter referred to as DST) may be used.

Furthermore, as the transform processing, multiple transform selection (MTS) that enables selection of a transform basis suitable for deviation of the coefficient of the prediction residual signal from the plurality of transform bases disclosed in Non Patent Literature 1 for each of the horizontal and vertical directions, or low frequency-non-separable transform (LFNST) that improves the coding performance by further concentrating the transform coefficient after the primary transform in the low frequency region may be used.

The inverse transform/inverse quantization unit 132 is configured to perform inverse transform processing for the coefficient level value output from the transform/quantization unit 131. Here, the inverse transform/inverse quantization unit 132 may be configured to perform inverse quantization of the coefficient level value prior to the inverse transform processing.

Here, the inverse transform processing and the inverse quantization are performed in a reverse procedure to the transform processing and the quantization performed by the transform/quantization unit 131.

The encoding unit 140 is configured to code the coefficient level value output from the transform/quantization unit 131 and output coded data.

Here, for example, the coding is entropy coding in which codes of different lengths are assigned based on a probability of occurrence of the coefficient level value.

Furthermore, the encoding unit 140 is configured to code control data used in decoding processing in addition to the coefficient level value.

Here, the control data may include size data such as a coding block (coding unit (CU)) size, a prediction block (prediction unit (PU)) size, and a transform block (transform unit (TU)) size.

Furthermore, the control data may include information (flag and index) necessary for control of the inverse transformation/inverse quantization processing of the inverse transform/inverse quantization unit 220, the inter prediction signal generation processing of the inter prediction unit 241, the intra prediction signal generation processing of the intra prediction unit 242, the synthesis processing of the inter prediction signal or/and the intra prediction signal of the blending unit 243, the filter processing of the in-loop filter processing unit 250, and the like in the image decoding device 200 described later.

Note that, in Non Patent Literature 1, these pieces of control data are referred to as syntaxes, and the definition thereof is referred to as semantics.

Furthermore, the control data may include header information such as a sequence parameter set (SPS), a picture parameter set (PPS), and a slice header as described later.

The in-loop filtering processing unit 150 is configured to execute filtering processing on the pre-filtering decoded signal output from the adder 122 and output the filtered decoded signal to the frame buffer 160.

Herein, for example, the filter processing is deblocking filter processing, which reduces the distortion generated at boundary parts of blocks (encoded blocks, prediction blocks, or conversion blocks), or adaptive loop filter processing, which switches filters based on filter coefficients, filter selection information, local properties of picture patterns of an image, etc. transmitted from the image encoding device 100.

The frame buffer 160 is configured to accumulate the reference frames used by the inter prediction unit 111.

Here, the filtered decoded signal constitutes the reference frame used by the inter prediction unit 111.

(Image Decoding Device 200)

Figure 3:
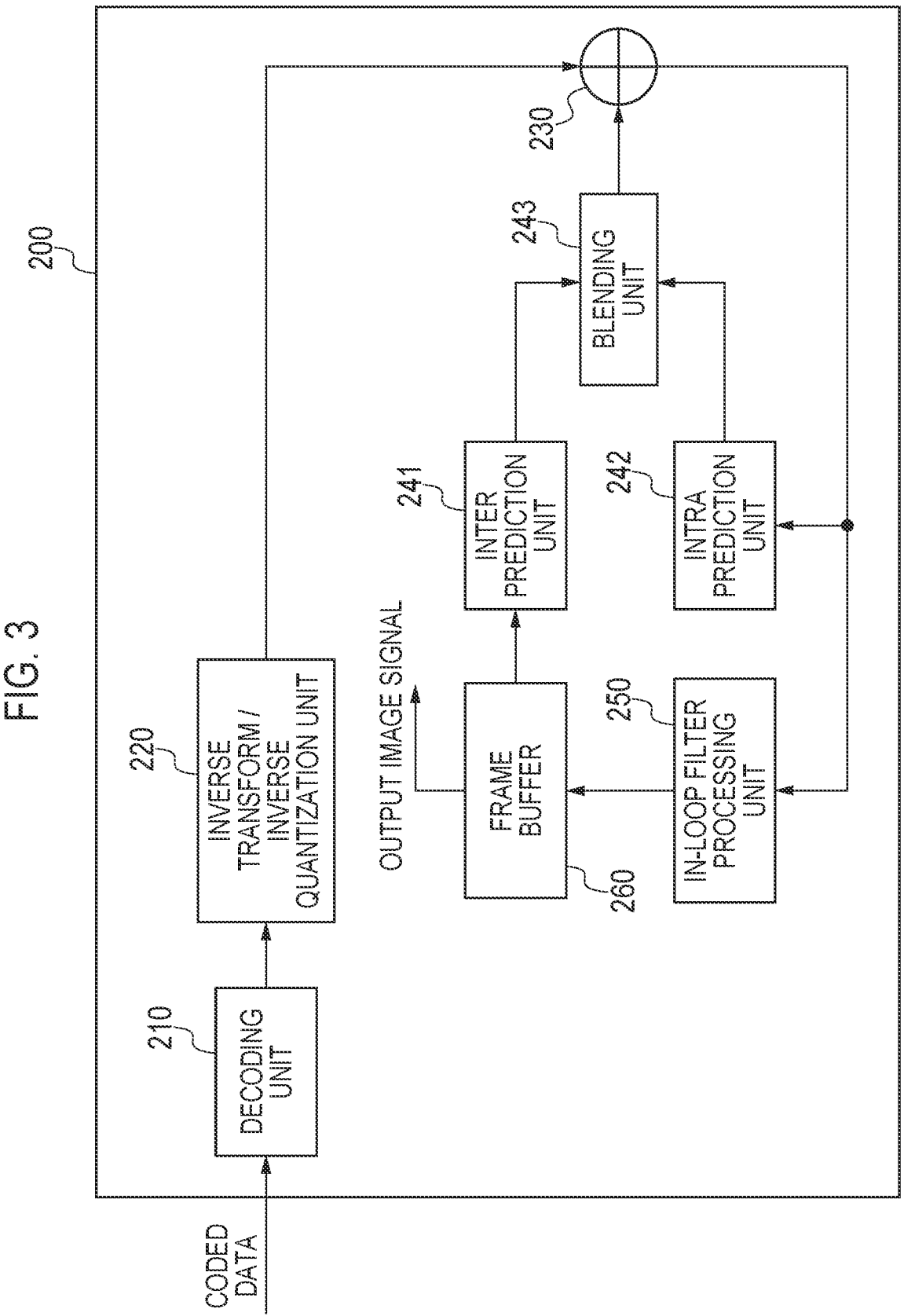
FIG. 3 is a diagram illustrating an example of functional blocks of an image decoding device 200 according to an embodiment.

Hereinafter, the image decoding device 200 according to the present embodiment will be described with reference to FIG. 3. FIG. 3 is a diagram illustrating an example of functional blocks of the image decoding device 200 according to the present embodiment.

As illustrated in FIG. 3, the image decoding device 200 includes a decoding unit 210, an inverse transform/inverse quantization unit 220, an adder 230, an inter prediction unit 241, an intra prediction unit 242, an in-loop filtering processing unit 250, and a frame buffer 260.

The decoding unit 210 is configured to decode the coded data generated by the image coding device 100 and decode the coefficient level value.

Here, the decoding is, for example, entropy decoding performed in a reverse procedure to the entropy coding performed by the encoding unit 140.

Furthermore, the decoding unit 210 may be configured to acquire control data by decoding processing for the coded data.

Here, the control data may include information related to the block size of the decoded block (synonymous with a block to be encoded in the above-described image encoding device 100, hereinafter, collectively referred to as a target block) described above.

Furthermore, the control data may include information (flag or index) necessary for control of the inverse transformation/inverse quantization processing of the inverse transform/inverse quantization unit 220, the predicted sample generation processing of the inter prediction unit 241 or the intra prediction unit 242, the filter processing of the in-loop filter processing unit 250, and the like.

Furthermore, the control data may include header information such as a sequence parameter set (SPS), a picture parameter set (PPS), a picture header (PH), or a slice header (SH) described above.

The inverse transform/inverse quantization unit 220 is configured to perform inverse transform processing for the coefficient level value output from the decoding unit 210. Here, the inverse transform/inverse quantization unit 220 may be configured to perform inverse quantization of the coefficient level value prior to the inverse transform processing.

Here, the inverse transform processing and the inverse quantization are performed in a reverse procedure to the transform processing and the quantization performed by the transform/quantization unit 131.

The adder 230 is configured to add the prediction signal to the prediction residual signal output from the inverse transform/inverse quantization unit 220 to generate a pre-filtering decoded signal, and output the pre-filtering decoded signal to the intra prediction unit 242 and the in-loop filtering processing unit 250.

Here, the pre-filtering decoded signal constitutes a reference block used by the intra prediction unit 242.

Similarly to the inter prediction unit 111, the inter prediction unit 241 is configured to generate a prediction signal by inter prediction (inter-frame prediction).

Specifically, the inter prediction unit 241 is configured to generate the prediction signal for each prediction block based on the motion vector decoded from the coded data and the reference signal included in the reference frame. The inter prediction unit 241 is configured to output the prediction signal to the adder 230.

Similarly to the intra prediction unit 112, the intra prediction unit 242 is configured to generate a prediction signal by intra prediction (intra-frame prediction).

Specifically, the intra prediction unit 242 is configured to specify the reference block included in the target frame, and generate the prediction signal for each prediction block based on the specified reference block. The intra prediction unit 242 is configured to output the prediction signal to the adder 230.

Like the blending unit 113, the blending unit 243 is configured to blend the inter prediction signal input from the inter prediction unit 111 and/or the intra prediction signal input from the intra prediction unit 112 using a preset weighting factor, and output the blended prediction signal (hereinafter, collectively referred to as a prediction signal) to the adder 122.

Here, a process for blending the inter prediction signal and/or the intra prediction signal performed by the blending unit 243 can have the same configuration as that of Non Patent Reference 1 or the like, and description thereof is omitted.

The adder 230 is configured to add the prediction signal output from the blending unit 243 to the prediction residual signal output from the inverse transform/inverse quantization unit 220 to generate a pre-filtering decoded signal, and output the pre-filtering decoded signal to the in-loop filtering processing unit 250.

Similarly to the in-loop filtering processing unit 150, the in-loop filtering processing unit 250 is configured to execute filtering processing on the pre-filtering decoded signal output from the adder 230 and output the filtered decoded signal to the frame buffer 260.

Herein, for example, the filter processing is deblocking filter processing, which reduces the distortion generated at boundary parts of blocks (encoded blocks, prediction blocks, conversion blocks, or sub-blocks obtained by dividing them), or adaptive loop filter processing, which switches filters based on filter coefficients, filter selection information, local properties of picture patterns of an image, etc. transmitted from the image encoding device 100.

Similarly to the frame buffer 160, the frame buffer 260 is configured to accumulate the reference frames used by the inter prediction unit 241.

Here, the filtered decoded signal constitutes the reference frame used by the inter prediction unit 241.

(Geometric Partitioning Mode)

Hereinafter, with reference to FIGS. 4 and 5, application of the geometric partitioning mode disclosed in Non Patent Literature 1 related to the decoding unit 210, the inter prediction unit 241, and the intra prediction unit 242 and the first geometric partitioning mode (GPM) according to the present embodiment to the intra prediction mode will be described.

Figure 4:
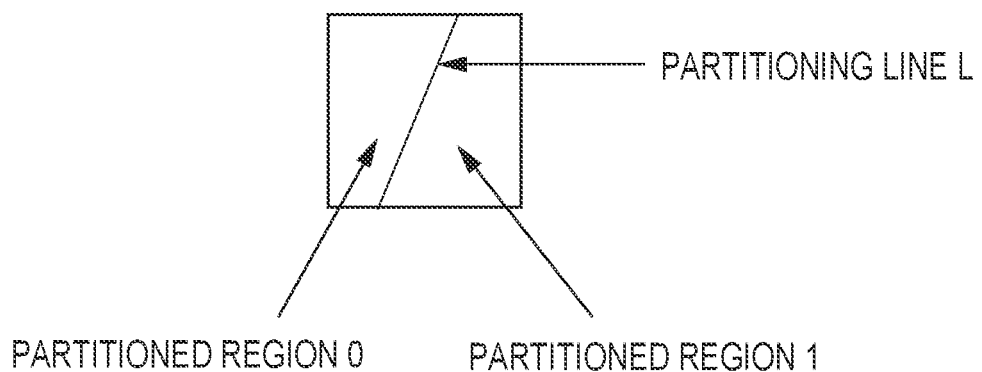
FIG. 4 is a diagram illustrating an example of a case where a rectangular decoding target block is partitioned into two regions of partitioned region 0 and partitioned region 1 of a geometric shape by a partitioning line of a geometric partitioning mode according to the geometric partitioning mode disclosed in Non Patent Literature 1.

FIG. 4 illustrates an example of a case where a rectangular decoding target block is partitioned into two regions of partitioned region 0 and partitioned region 1 of a geometric shape by a partitioning line L1 of the geometric partitioning mode according to the geometric partitioning mode disclosed in Non Patent Literature 1.

Here, sixty-four patterns of the partitioning line L1 of the geometric partitioning mode disclosed in Non Patent Literature 1 are prepared according to the angle and the displacement.

Furthermore, the GPM according to Non Patent Literature 1 applies a normal merge mode, which is a type of inter prediction, to each of the partitioned region 0 and the partitioned region 1 to generate an inter predicted (motion-compensated) sample.

Specifically, in such a GPM, a merge candidate list disclosed in Non Patent Literature 1 is constructed, a motion vector and a reference frame of each partitioned region 0/1 are derived on the basis of the merge candidate list and the merge index transmitted from the image encoding device 100, and a reference block, that is, an inter predicted (or motion compensated) block is generated. Finally, the inter predicted samples of each partitioned region 0/1 are weight-averaged by a preset weight and blended.

Since the method disclosed in Non Patent Literature 1 can be applied to the present invention, the detailed description of the method for constructing the merge candidate list is omitted.

Figure 5:
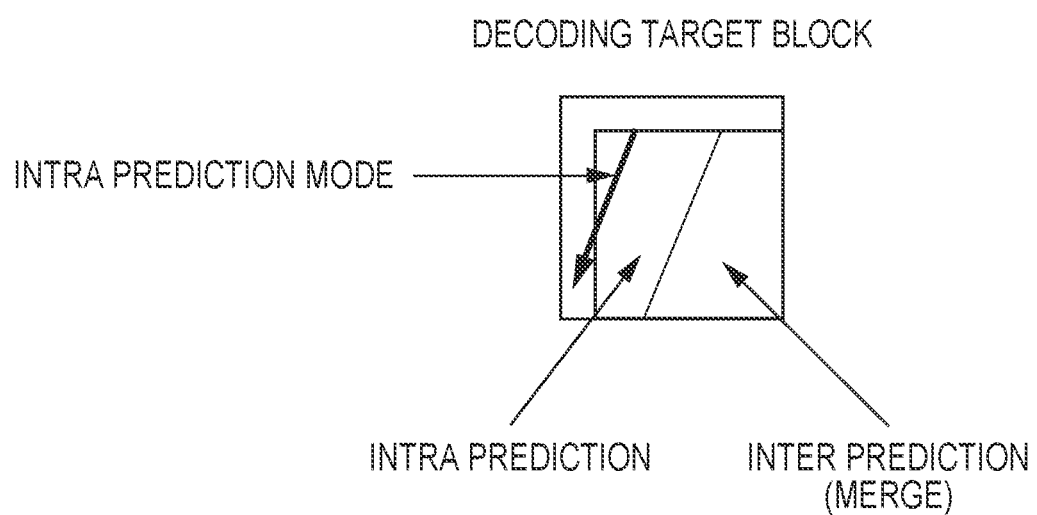
FIG. 5 is a diagram illustrating an example of application of an intra prediction mode to a GPM according to the present embodiment.

FIG. 5 illustrates an example of application of the intra prediction mode to the GPM according to the present embodiment.

Since the predicted sample generation of the GPM according to Non Patent Literature 1 is limited to the normal merge mode, which is a type of inter prediction (motion compensation), there is room for improvement in coding performance.

On the other hand, the first GPM and the second GPM according to the present embodiment proposes improvement of the coding performance by applying an intra prediction mode in addition to the normal merge mode to generate the predicted sample of the GPM.

Here, in the first GPM and the second GPM, either the normal merge mode or the intra prediction mode can be applied to each partitioned region 0/1, and the type of the intra prediction mode is limited according to the partitioning shape (partitioning line) of the decoding target block.

In the first method, two different intra prediction modes can be applied to two partitioned regions 0/1 partitioned by the GPM.

However, such a determination method is based on the assumption that the GPM can provide two different intra prediction modes.

The present embodiment proposes, with respect to a method for determining applicability, to the decoding target block, of a GPM to which the intra prediction mode is additionally applied and the prediction mode type in each of the partitioned regions 0/1 when the GPM is applied, prohibition of a GPM configured by two different intra prediction modes with low selectivity as a result of comparison between a GPM configured by two different inter predictions and a GPM configured by an inter prediction and an intra prediction.

In this way, the GPM to which the intra prediction mode is additionally applied is appropriately applied to the decoding target block, and the optimum prediction mode is specified, so that the coding performance can be further improved.

Hereinafter, the method of specifying the possibility of application of the GPM in the second GPM and the prediction mode type in each partitioned region 0/1 when the GPM is applied (or a generally called signaling method) according to the present embodiment will be described from two viewpoints of the specifying method based on the encoded data (encoded bit stream) itself decoded by the decoding unit 210 and the control data (syntax) included in the encoded data in the decoding unit 210.

(Encoded Data Decoded by Decoding Unit 210)

Figure 6:
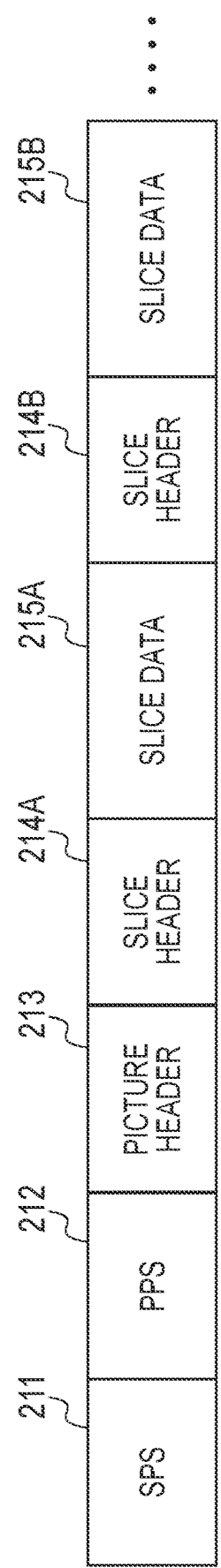
FIG. 6 is a diagram illustrating an example of a configuration of encoded data received by a decoding unit 210 disclosed in Non Patent Reference 1.

Hereinafter, encoded data decoded by the decoding unit 210 will be described with reference to FIG. 6. FIG. 6 is a diagram illustrating an example of a configuration of encoded data received by the decoding unit 210 disclosed in Non Patent Literature 1.

As illustrated in FIG. 6, the encoded data may include an SPS 211 at the head of the stream. The SPS 211 is a set of control data in units of sequences (sets of pictures). Each SPS 211 includes at least SPS id information for individually identifying a plurality of SPSs.

As illustrated in FIG. 6, the encoded data may include a PPS 212 next to the SPS 211. Here, the PPS 212 is a set of control data in units of pictures (sets of slices). Each PPS 212 includes at least PPS id information for identifying each PPS 212 when there are a plurality of PPS. In addition, at least SPS id information for designating the SPS 211 corresponding to each PPS 212 is included.

As illustrated in FIG. 6, the encoded data may include a picture header 213 next to the PPS 212. The picture header 213 is also a set of control data in units of pictures (sets of slices). The PPS 212 may share a single PPS 212 for multiple pictures. On the other hand, the picture header 213 is always transmitted for each picture. The picture header 213 includes at least PPS id information for designating the PPS 212 corresponding to each picture.

As illustrated in FIG. 6, the encoded data may include a slice header 213 next to the picture header 214A. The slice header 214A is a set of control data in units of slices. The slice header 214A can also include information of the picture header 213 described above as part of the slice header.

As illustrated in FIG. 6, the encoded data may include slice data 215A next to the slice header 214A. The slice data 215A may include the above-described coefficient level value, size data, and the like.

As described above, one slice header, one picture header, one PPS, and one SPS correspond to each piece of slice data 215A/215B. As described above, since which PPS 212 will be referred to in the picture header 213 is designated by the PPS id, and which SPS 211 will be referred to by the PPS 212 is designated by the SPS id, the SPS 211 and the PPS 212 common to the plurality of pieces of slice data 215A/215B can be used.

In other words, the SPS 211 and the PPS 212 do not necessarily need to be transmitted for each picture and for each slice. For example, as illustrated in FIG. 6, a stream configuration may be employed in which the SPS 211 and the PPS 212 are not encoded immediately before the slice headers 214A/214B.

Note that the configuration illustrated in FIG. 6 is merely an example. As long as the control data designated by the slice headers 214A/214B, the picture header 213, the PPS 212, and the SPS 211 correspond to each piece of slice data 215A/215B, elements other than these may be added as the components of the stream. Similarly, the configuration may be shaped into a configuration different from that in FIG. 6 at the time of transmission.

(Method for Specifying Applicability of GPM in Units of Sequences)

Hereinafter, a method in which the decoding unit 210 specifies whether the GPM can be applied based on the control data at the decoding target sequence level and whether the intra prediction mode can be applied to the GPM will be described with reference to FIGS. 7 and 8.

Figure 7:
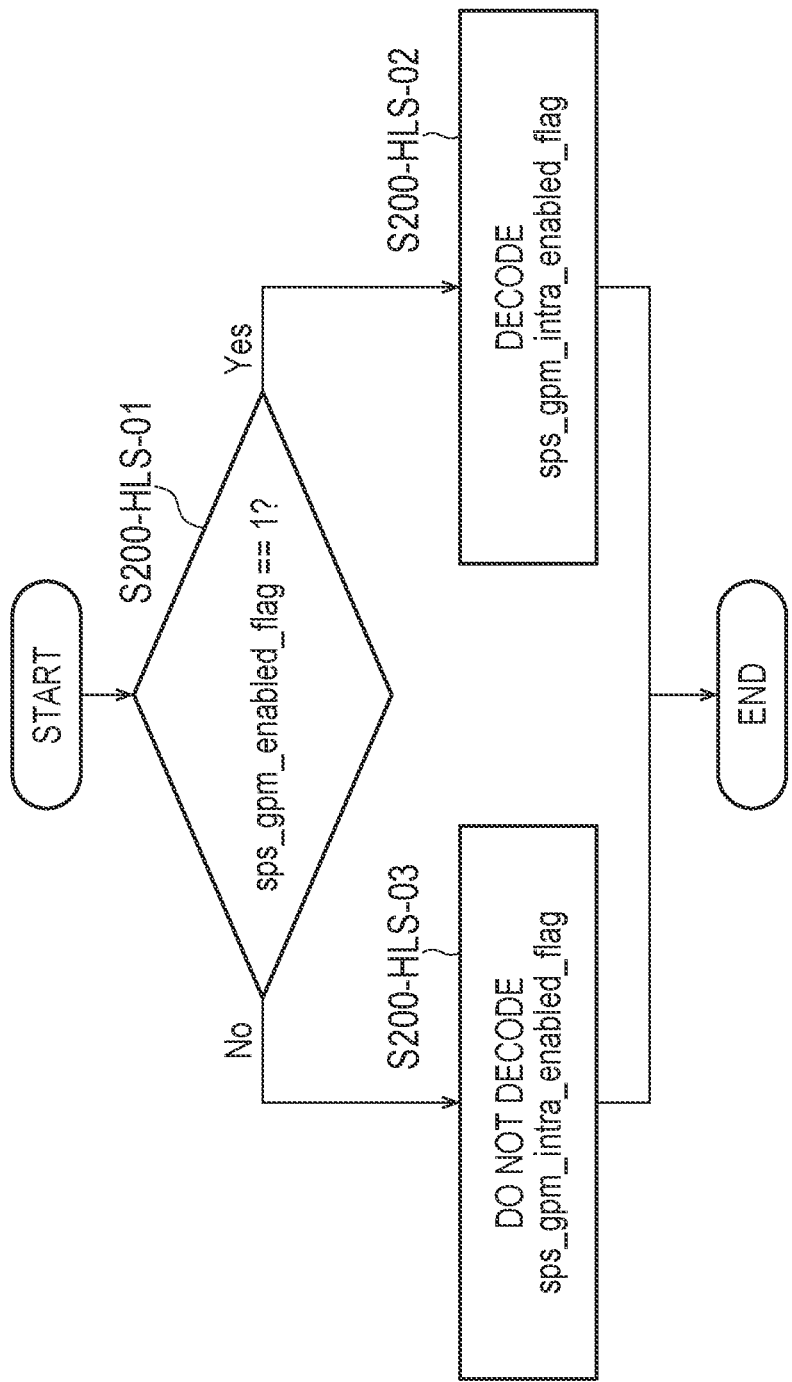
FIG. 7 is a flowchart illustrating an example of a method in which the decoding unit 210 specifies whether the GPM can be applied and whether the intra prediction mode can be applied to the GPM on the basis of a GPM-related flag in units of SPS.

FIG. 7 is a flowchart illustrating an example of a method in which the decoding unit 210 specifies whether the GPM can be applied and whether the intra prediction mode can be applied to the GPM on the basis of the GPM-related flag in units of SPS.

As illustrated in FIG. 7, in step S200-HLS-01, the decoding unit 210 determines whether the value of sps_gpm_enabled_flag is 1.

When the value of sps_gpm_enabled_flag is 1, the decoding unit 210 proceeds to step S200-HLS-02. When the value of sps_gpm_enabled_flag is not 1, the decoding unit 210 proceeds to step S200-HLS-03.

Here, sps_gpm_enabled_flag is a syntax (first syntax) that controls whether the geometric partitioning mode of the decoding target sequence can be applied. When the value of sps_gpm_enabled_flag is 1, it indicates that GPM is enabled. When the value of sps_gpm_enabled_flag is 0, it indicates that GPM is disabled.

Note that the decoding unit 210 can determine the value of sps_gpm_enabled_flag in step S200-HLS-01 by decoding sps_gpm_enabled_flag before step S200-HLS-01.

Further, when sps_gpm_enabled_flag does not exist, the decoding unit 210 may infer the value of sps_gpm_enabled_flag as 0.

In step S200-HLS-02, the decoding unit 210 decodes sps_gpm_intra_enabled_flag, and this processing ends.

On the other hand, in step S200-HLS-03, the decoding unit 210 ends this processing without decoding sps_gpm_intra_enabled_flag.

Here, sps_gpm_intra_enabled_flag is a syntax (second syntax) that controls whether the intra prediction mode can be applied to the geometric partitioning mode of the decoding sequence. When the value of sps_gpm_intra_enabled_flag is 1, it indicates that the intra prediction mode can be applied to the GPM. When the value of sps_gpm_intra_enabled_flag is 0, it indicates that the intra prediction mode cannot be applied to the GPM.

Note that, when sps_gpm_intra_enabled_flag does not exist, the decoding unit 210 may infer the value of sps_gpm_intra_enabled_flag as 0.

The reason why the decoding unit 210 does not decode sps_gpm_intra_enabled_flag in step S200-HLS-03 is that since the value of sps_gpm_enabled_flag is 0, that is, it can be specified in the previous stage that GPM is not applicable in the decoding target sequence, there is no meaning to decode sps_gpm_intra_enabled_flag. By adopting this method, unnecessary decoding (encoding) of sps_gpm_intra_enabled_flag can be avoided.

The type of the intra prediction mode applied to the GPM is configured by the intra prediction mode corresponding to the partitioning line (for example, partitioning line L1 illustrated in FIG. 4) in the first GPM.

For example, the type of the intra prediction mode applied to the GPM may include an angular mode parallel to the partitioning line L1 in the GPM and/or an angular mode perpendicular to the partitioning line L1. Alternatively, the type of the intra prediction mode applied to the GPM may include the angular mode near these angular modes.

Note that, when there are two or more angular modes parallel to the partitioning line L1 or two or more angular modes perpendicular to the partitioning line L1 (for example, when the partitioning line L1 has the same angle as the diagonal line of the square block,), the type of the intra prediction mode applied to the GPM may be limited to either one.

For example, by adopting a method of limiting the decoding target block in the order of processing of adjacent decoded blocks, that is, by limiting the decoding target block to a direction in which reference samples are acquired from an adjacent block on the left or above an adjacent block on the right or below the adjacent block, it is possible to reduce the dependency of decoding processing between blocks at the time of generating predicted samples.

In addition, the type of the intra prediction mode applied to the GPM may include an intra prediction mode that does not depend on the partitioning line L1, for example, a planar mode, a DC mode, or the like, in addition to the angular mode.

Note that, in the above description, it has been described that the decoding necessity is determined at the sequence level with respect to the syntax for controlling the possibility of the application of the intra prediction mode to the geometric partitioning mode and the syntax for specifying the maximum number of candidates of the intra prediction mode type to be applied to the GPM. However, in order to perform control at a finer granularity, for example, decoding may be performed at the level of the PPS, the picture header, or the slice header.

However, since the code amount of the syntax to be decoded (encoded) increases when the control unit is finer, the design may be performed by evaluating the trade-off between the improvement of the prediction performance due to the finer control unit and the increase in the code amount of the syntax according to the designer's intention.

(Method of Determining Whether to Apply GPM in Units of Blocks)

Figure 9:
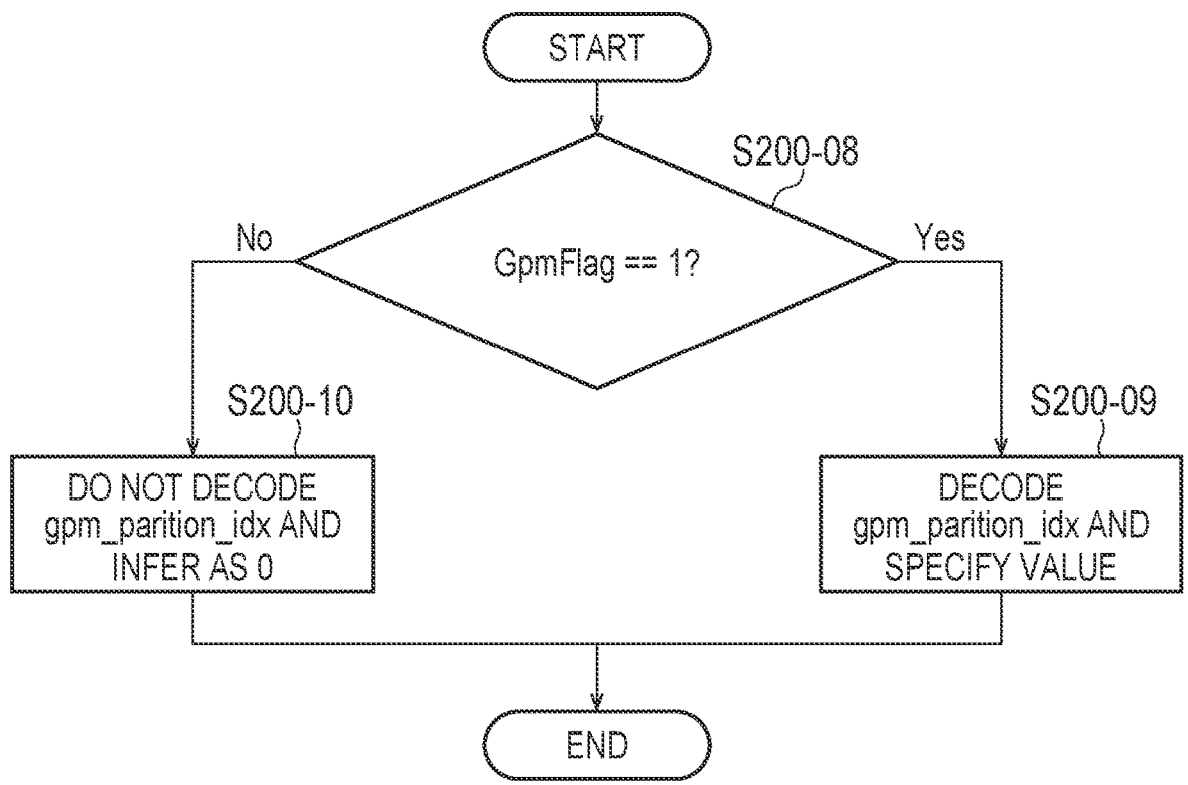
FIG. 9 is a flowchart illustrating an example of a method in which the decoding unit 210 determines a GPM partitioning mode (a type of partitioning line) for each block of a decoding target block.

Hereinafter, whether the decoding unit 210 will apply the GPM to the decoding target block will be described with reference to FIG. 9. FIG. 9 is a flowchart illustrating an example of a method in which the decoding unit 210 determines whether to apply the GPM to the decoding target block.

Figure 8:
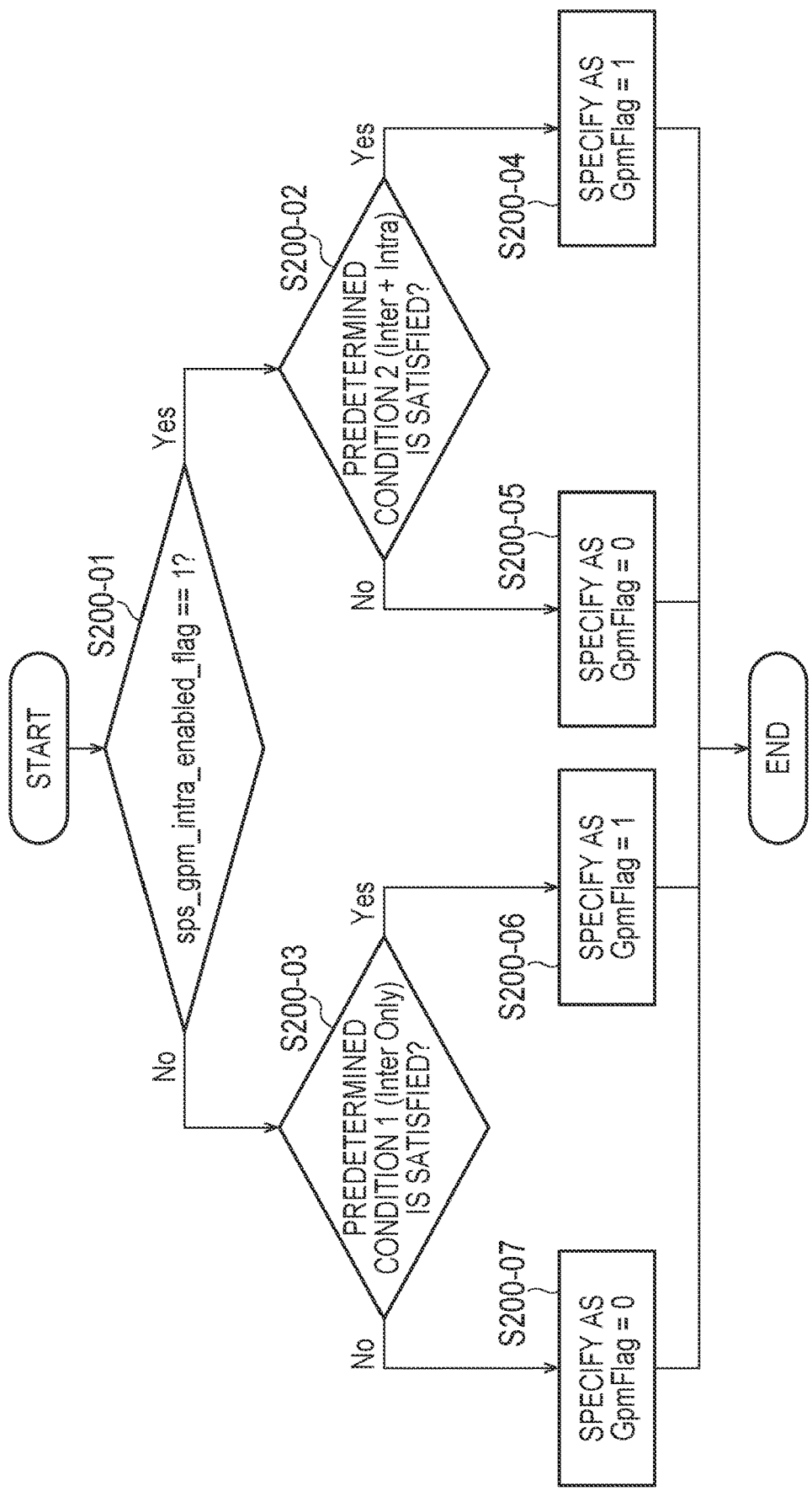
FIG. 8 is a flowchart illustrating an example of a method for determining whether the decoding unit 210 applies the GPM to a decoding target block.

As illustrated in FIG. 8, in step S200-01, the decoding unit 210 determines whether the value of sps_gpm_intra_enabled_flag is 1. When the value of sps_gpm_intra_enabled_flag is 1, the processing proceeds to step S200-2. When the value of sps_gpm_intra_enabled_flag is 0, the processing proceeds to step S200-03.

In step S200-03, the decoding unit 210 determines whether predetermined condition 1 (alternatively, the first predetermined condition) is satisfied. When predetermined condition 1 is satisfied, the decoding unit 210 proceeds to step S200-06. When predetermined condition 1 is not satisfied, the decoding unit 210 proceeds to step S200-07. Details of the predetermined condition 1 will be described later.

In step S200-06, the decoding unit 210 specifies the value of GpmFlag as 1 and ends this processing. In step S200-07, the decoding unit 210 specifies the value of GpmFlag as 0 and ends this processing.

Here, GpmFlag is an internal parameter (first internal parameter or second internal parameter) that specifies (controls) whether GPM is applied to the decoding target block. When the value of GpmFlag is 1, it indicates that GPM is applied to the decoding target block (GPM is enabled). When the value of GpmFlag is 0, it indicates that GPM is not applied to the decoding target block (GPM is disabled).

Since the predetermined condition 1 is a condition for determining whether to apply the GPM to which the intra prediction mode is not applied, the same condition disclosed in Non Patent Literature 1 may be used. Specifically, all the following conditions are satisfied.

The value of sps_gpm_enabled_flag is 1.
sh_slice_type is B.
The value of general_merge_flag is 1.
The width of the decoding target block is 8 samples or more.
The height of the decoding target block is 8 samples or more.
The width of the decoding target block is less than 128 samples.

The height of the decoding target block is less than 128 samples.

The width of the decoding target block is less than eight times the height of the decoding target block.

The height of the decoding target block is less than eight times the width of the decoding target block.

The value of regular_merge_flag is 1.

The value of merge_subblock_flag is 0.

The value of clip_flag is 0.

Here, sh_slice_type is a syntax (fourth syntax) indicating a type of a decoding target slice, and in Non Patent Literature 1, two merge vectors different from each other for a GPM-applied block are used for generating a predicted sample of each partitioned region. Therefore, sh_slice_type can be applied only to a B-slice in which it is obvious that there are two motion vectors in the entire slice (conversely, it means that GPM cannot be applied to a P-slice in which it is obvious that there is only one motion vector in the entire slice).

Here, various conditions regarding general_merge_flag, regular_merge_flag, merge_subblock_flag, and clip_flag can have the same configuration as in Non Patent Literature 1, and thus description thereof will be omitted.

In addition, the condition that the width and height of the decoding target block are eight samples or more is intended to reduce the worst case of the number of reference samples (memory bandwidth) required for motion compensation, and is introduced in Non Patent Literature 1. Specifically, in Non Patent Literature 1, the lower limit value of the block size of a uni-predictive block having one motion vector is set to 4×8/8×4 samples, and the lower limit value of the block size of a bi-predictive block having two motion vectors is set to 8×8 samples. Therefore, the same lower limit value is considered as an application condition for the GPM-applied block, which is a type of bi-predictive block.

The condition that the width (or height) of the decoding target block is less than 8 times the height (or width) of the decoding target block is limited from the viewpoint of making GPM inapplicable to a block having a low application rate of GPM in order to reduce the number of times of tentative encoding processing for evaluating whether to apply GPM in the image encoding device 100, and eventually to reduce the encoding processing amount.

In contrast to step S200-03 described above, in step S200-02, the decoding unit 210 determines whether predetermined condition 2 (alternatively, the second predetermined condition) is satisfied. When predetermined condition 2 is satisfied, the decoding unit 210 proceeds to step S200-04. When predetermined condition 1 is not satisfied, the decoding unit 210 proceeds to step S200-05. Details of the predetermined condition 2 will be described later.

In step S200-04, the decoding unit 210 specifies the value of GpmFlag as 1 and ends this processing. In step S200-05, the decoding unit 210 specifies the value of GpmFlag as 0 and ends this processing.

Here, since the predetermined condition 2 is a condition for determining whether the GPM to which the intra prediction mode is applied is applied, the following condition included in the predetermined condition 1 may be eliminated.

sh_slice_type is B.

The width of the decoding target block is 8 samples or more.

The height of the decoding target block is 8 samples or more.

The width of the decoding target block is less than eight times the height of the decoding target block.

The height of the decoding target block is less than eight times the width of the decoding target block.

First, the condition regarding sh_slice_type may be changed to one that sh_slice_type be a B-slice or a P-slice. Because the intra prediction mode for the GPM enables the GPM to be applied to the P-slice (biprediction is limited) and, as a result, the number of blocks to which the GPM is applied increases, improvement in coding performance can be expected.

For example, GPM in which the merge mode is applied to one of the partitioned regions and the intra prediction mode is applied to the other partitioned region can be applied to the P-slice.

Second, regarding the elimination of the condition that the width and height of the decoding target block are 8 samples or more, when the intra prediction mode is applied to at least one of the partitioned regions of the GPM, the lower limit value (8×8 samples) of the block size set in consideration of the memory bandwidth of the worst case of the bi-predictive block can be relaxed to the lower limit value (4×8/8×4 samples) of the block size of the uni-predictive block. As a result, since the GPM can be applied to the small-size block to which the GPM cannot be applied in Non Patent Literature 1, the number of blocks to which the GPM is applied increases, and improvement in coding performance can be expected.

Third, regarding the elimination of the condition regarding the aspect ratio of the decoding target block (=elimination of condition that width (or height) of decoding target block is less than eight times height (or width) of decoding target block), if the prediction performance of the intra prediction mode is relaxed by being limited to a small-size block having a relatively high prediction performance by introduction of the intra prediction mode to the GPM, the number of blocks to which the GPM is applied increases, and improvement of the coding performance can be expected.

For example, in Non Patent Literature 1, the restriction may be eliminated for a 4×16/16×4 sample block and/or a 4×32/32×4 sample block and/or an 8×64/64×8 sample block to which GPM cannot be applied.

(Method of Determining GPM Partitioning Mode (Type of Partitioning Line L1) in Units of Blocks)

Hereinafter, a method in which the decoding unit 210 determines the GPM partitioning mode (the type of the partitioning line L1) in units of blocks will be described with reference to FIG. 9. FIG. 9 is a flowchart illustrating an example of a method in which the decoding unit 210 determines the GPM partitioning mode (the type of the partitioning line L1) in units of blocks of the decoding target block.

As illustrated in FIG. 9, in step S200-08, the decoding unit 210 determines whether the value of GpmFlag is 1. When the value of GpmFlag is 1, the processing proceeds to step S200-09. When the value of GpmFlag is 0, the processing proceeds to step S200-10.

In step S200-09, the decoding unit 210 decodes gpm_partition_idx included in the control data, specifies a value of gpm_partition_idx and ends this processing.

In step S200-10, the decoding unit 210 ends this processing without decoding gpm_partition_idx included in the control data, and infers the value of gpm_partition_idx as 0.

Here, gpm_partition_idx is a syntax (fifth syntax) for specifying a partitioning shape (a direction of the partitioning line L1) of the geometric partitioning mode of the decoding target block.

In Non Patent Literature 1, since the value of 0 to 63 of gpm_partition_idx corresponds to the directions of the above-described sixty-four types of partitioning lines L1, the decoding unit 210 can specify (infer) the value of gpm_partition_idx to specify the partitioning shape (the direction of the partitioning line L1) of the geometric partitioning mode of the decoding target block.

Note that, in step S200-10, the decoding unit 210 ends this processing without decoding gpm_partition_idx included in the control data. This is intended to avoid unnecessary decoding of gpm_partition_idx (reduce the transmission code amount) since it can be specified that GPM is not applied to the decoding target block by the determination regarding GpmFlag in step S200-08.

(Method for Determining Whether to Apply Intra Prediction Mode in Partitioned Region 0)

Figure 10:
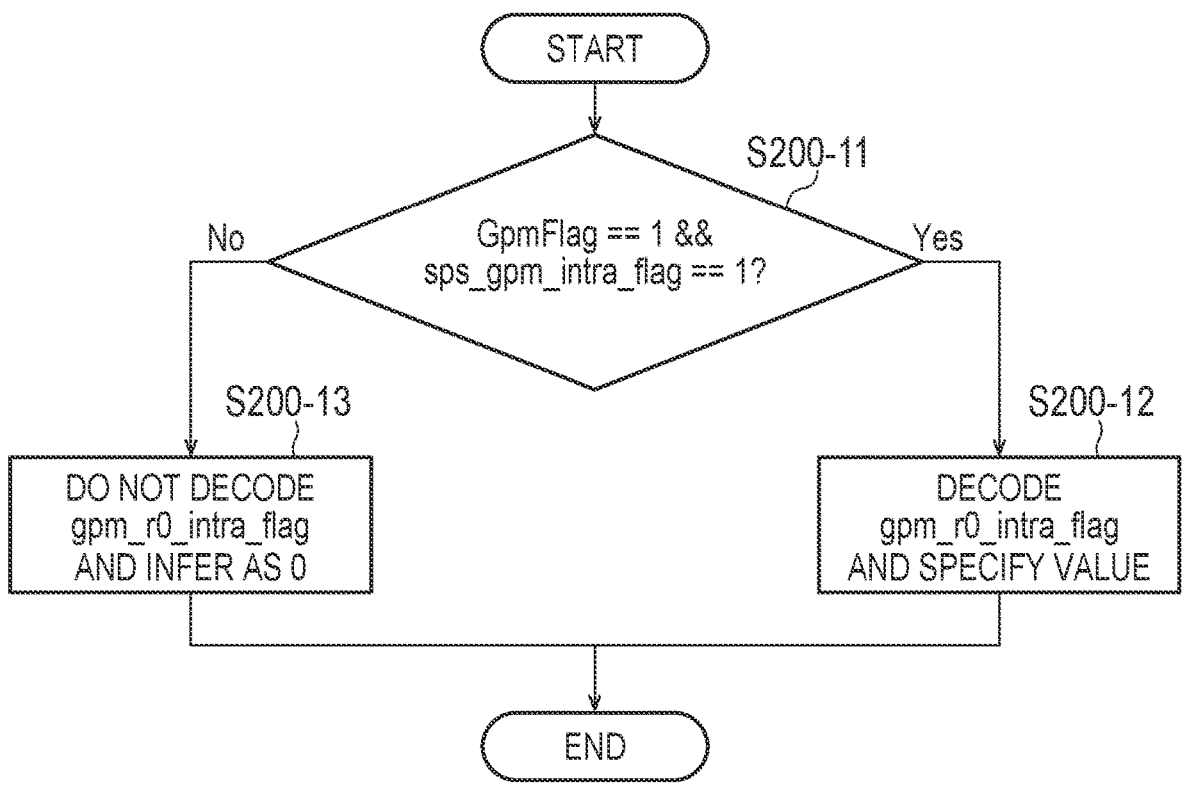
FIG. 10 is a flowchart illustrating a method in which the decoding unit 210 determines whether to apply the intra prediction mode to the partitioned region 0.

Hereinafter, a method in which the decoding unit 210 determines whether to apply the intra prediction mode in the partitioned region 0 will be described with reference to FIG. 10. FIG. 10 is a flowchart illustrating a method in which the decoding unit 210 determines whether to apply the intra prediction mode in the partitioned region 0.

As illustrated in FIG. 10, in step S200-11, the decoding unit 210 determines whether the value of GpmFlag is 1 and sps_gpm_intra_enabled_flag is 1. The decoding unit 210 proceeds to step S200-12 when such a condition is satisfied, and proceeds to step S200-13 when such a condition is not satisfied.

In step S200-12, the decoding unit 210 decodes gpm_r0_intra_flag included in the control data, specifies a value of gpm_r0_intra_flag and ends this processing. In step S200-13, the decoding unit 210 ends this processing without decoding gpm_r0_intra_flag included in the control data, and infers the value of gpm_r0_intra_flag as 0.

Here, gpm_r0_intra_flag is a syntax (sixth syntax) for specifying whether the prediction mode of the partitioned region 0 in the geometric partitioning mode of the decoding target block is the intra prediction mode.

The decoding unit 210 can specify that the intra prediction mode is applied (enabled) to the partitioned region 0 when the value of gpm_r0_intra_flag is 1, and can specify that the intra prediction mode is not applied (disabled) to the partitioned region 0 when the value of gpm_r0_intra_flag is 0.

Note that, when gpm_r0_intra_flag does not exist, the decoding unit 210 may infer the value of gpm_r0_intra_flag as 0.

In step S200-13, the decoding unit 210 ends this processing without decoding gpm_r0_intra_flag included in the control data. This is intended to avoid unnecessary decoding of gpm_r0_intra_flag (reduce the transmission code amount) since it can be specified in the determination in step S200-11 that GPM is not applied to the decoding target block or that the intra prediction mode is not applied to GPM in the partitioned region 0 even if GPM is applied.

(Method for Determining Whether Intra Prediction Mode is Applied in Partitioned Region 1)

Figure 11:
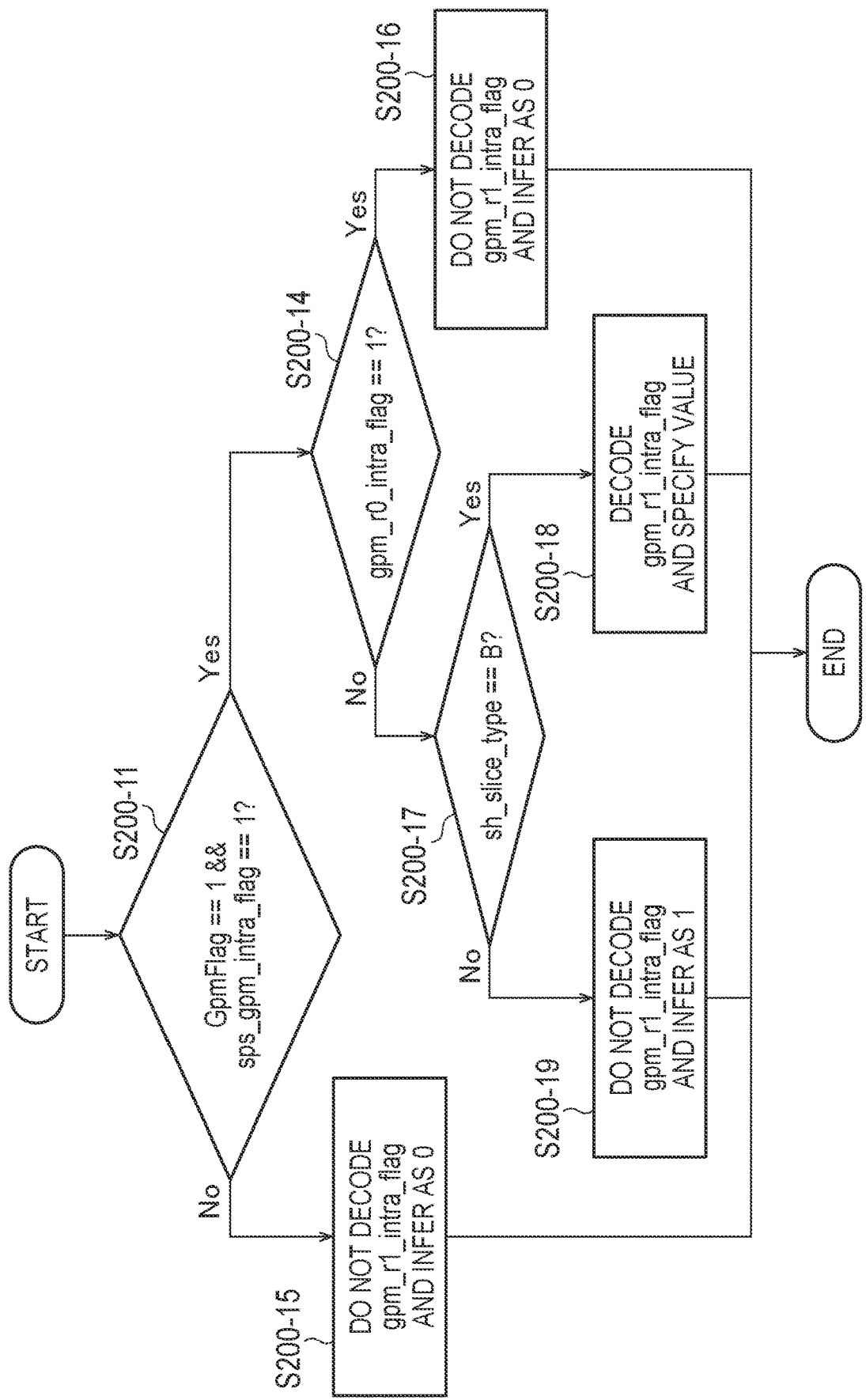
FIG. 11 is a flowchart illustrating a method in which the decoding unit 210 determines whether to apply the intra prediction mode to the partitioned region 1.

Hereinafter, a method in which the decoding unit 210 determines whether to apply the intra prediction mode in the partitioned region 1 will be described with reference to FIG. 11. FIG. 11 is a flowchart illustrating a method in which the decoding unit 210 determines whether to apply the intra prediction mode in the partitioned region 1.

As illustrated in FIG. 11, in step S200-11, the decoding unit 210 determines whether the value of GpmFlag is 1 and sps_gpm_intra_enabled_flag is 1. The decoding unit 210 proceeds to step S200-14 when such a condition is satisfied, and proceeds to step S200-15 when such a condition is not satisfied.

In step S200-14, the decoding unit 210 determines whether gpm_r0_intra_flag is 1. The decoding unit 210 proceeds to step S200-16 if the condition is satisfied, and proceeds to step S200-17 if the condition is not satisfied.

In step S200-15, the decoding unit 210 infers the value of gpm_r1_intra_flag included in the control data to be 0 without decoding gpm_r1_intra_flag, and ends the processing. In step S200-16, the decoding unit 210 infers the value of gpm_r1_intra_flag included in the control data to be 0 without decoding gpm_r1_intra_flag, and ends the processing.

In step S200-17, the decoding unit 210 determines whether sh_slice_type is B. The decoding unit 210 proceeds to step S200-18 if the condition is satisfied, and proceeds to step S200-19 if the condition is not satisfied.

In step S200-18, the decoding unit 210 specifies the value of gpm_r1_intra_flag included in the control data by decoding gpm_r1_intra_flag, and ends the processing. In step S200-19, the decoding unit 210 infers the value of gpm_r1_intra_flag included in the control data to be 0 without decoding gpm_r1_intra_flag, and ends the processing.

Here, gpm_r1_intra_flag is syntax (fourth syntax) for determining whether or not a prediction mode of a partitioned region 1, which is partitioned in the geometric partitioning mode of the decoding target block, is the intra prediction mode.

When a value of gpm_r1_intra_flag is 1, the decoding unit 210 can determine that the intra prediction mode is applied (valid) to the partitioned region 1, and when the value of gpm_r1_intra_flag is 0, the decoding unit 210 can determine that the intra prediction mode is not applied (invalid) to the partitioned region 1.

Note that, in a case where gpm_r1_intra_flag does not exist, the decoding unit 210 may infer the value of gpm_r1_intra_flag to be 0.

In steps S200-15 and S200-16, the decoding unit 210 ends the processing without decoding gpm_r1_intra_flag included in the control data, which is intended to avoid unnecessary decoding of gpm_r1_intra_flag (reduce the transmission code amount), since it can be determined in the determinations in steps S200-11 and S200-16 that the GPM is not applied to the decoding target block or that, even if the GPM is applied to the partitioned region 1, the intra prediction mode is not applied to the GPM.

(Method for Specifying Prediction Mode in Partitioned Region 0 when there is One Type of GPM-Applied Intra Prediction Mode)

Figure 12:
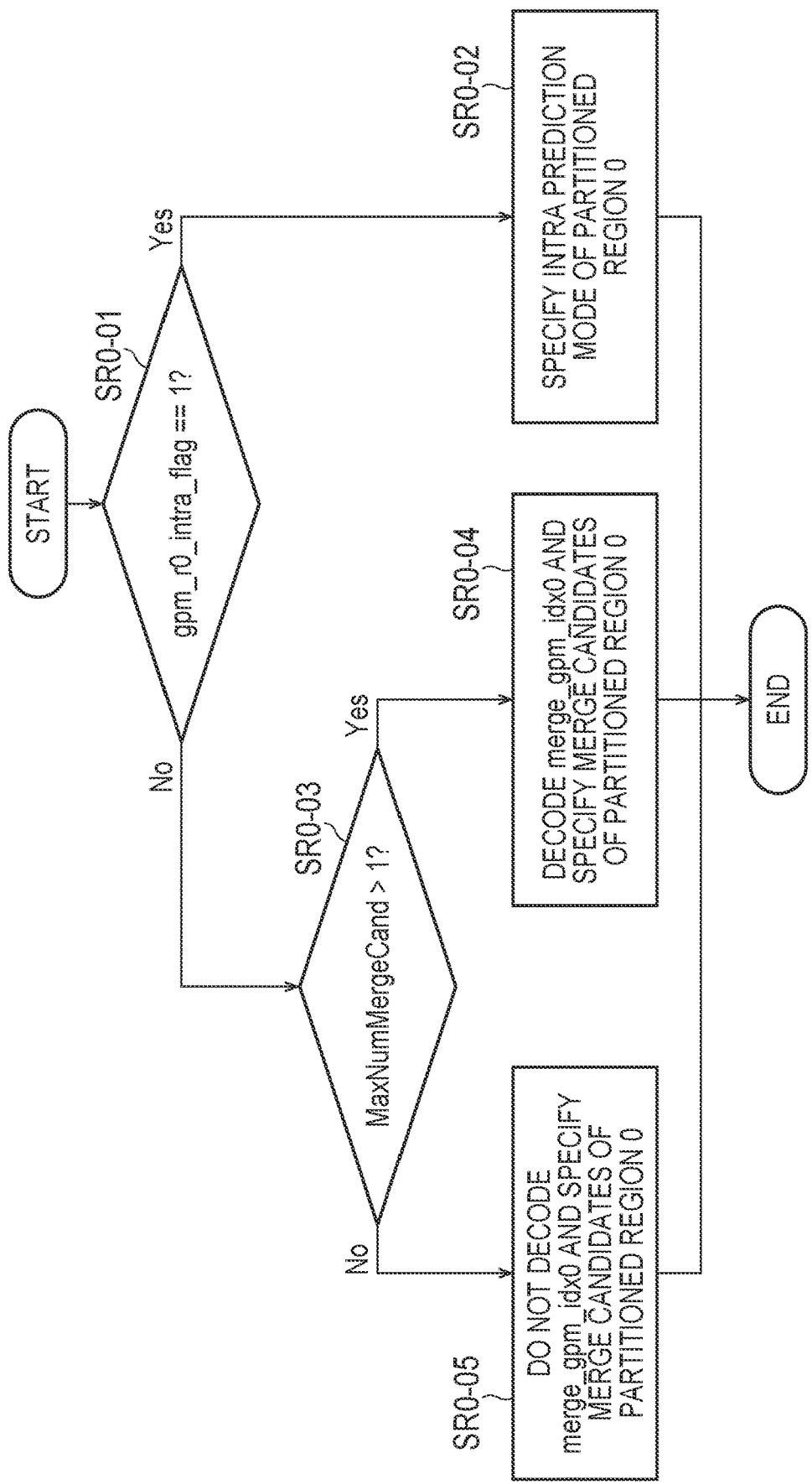
FIG. 12 is a flowchart illustrating an example of a method in which the decoding unit 210 specifies a prediction mode in the partitioned region 0 when there is one type of GPM-applied intra prediction mode.

Hereinafter, a method in which the decoding unit 210 specifies the prediction mode in the partitioned region 0 when there is one type of GPM-applied intra prediction mode will be described with reference to FIG. 12. FIG. 12 is a flowchart illustrating an example of a method in which the decoding unit 210 specifies the prediction mode in the partitioned region 0 when there is one type of GPM-applied intra prediction mode.

As illustrated in FIG. 12, in step SR0-01, the decoding unit 210 determines whether the value of gpm_r0_intra_flag is 1. The decoding unit 210 proceeds to step SR0-02 when such a condition is satisfied, and proceeds to step SR0-03 when such a condition is not satisfied.

In step SR0-02, the decoding unit 210 specifies the intra prediction mode of the partitioned region 0 as one type of intra prediction mode applicable to GPM, and this processing ends.

In step SR0-03, the decoding unit 210 determines whether the value of MaxNumMergeCand is greater than 1. The decoding unit 210 proceeds to step SR0-04 when such a condition is satisfied, and proceeds to step SR0-05 when such a condition is not satisfied.

Here, MaxNumMergeCand is an internal parameter (fourth internal parameter) representing the maximum number of merge candidates in the normal merge mode. Since the same configuration as the setting method disclosed in Non Patent Literature 1 can be used in the present embodiment, the maximum number will not be described in detail.

In step SR0-04, the decoding unit 210 decodes merge_gpm_idx0, specifies a merge candidate for the partitioned region 0, and ends this processing.

In step SR0-05, the decoding unit 210 does not decode merge_gpm_idx0, specifies a merge candidate for the partitioned region 0, and ends this processing.

Here, merge_gpm_idx0 is an index (merge index) that specifies a merge candidate for the partitioned region 0.

When merge_gpm_idx0 does not exist, the decoding unit 210 may infer the value of merge_gpm_idx0 as 0.

Here, in step SR0-05, the decoding unit 210 ends this processing without decoding merge_gpm_idx0, but in step SR0-03. This is intended to avoid unnecessary decoding (reduce the transmission code amount) of merge_gpm_idx0 since it can be specified that MaxNumMergeCand is 1, that is, the merge candidate for the partitioned region 0 can be specified as 0.

(Method for Specifying Prediction Mode in Partitioned Region 1 when there is One Type of GPM-Applied Intra Prediction Mode)

Figure 13:
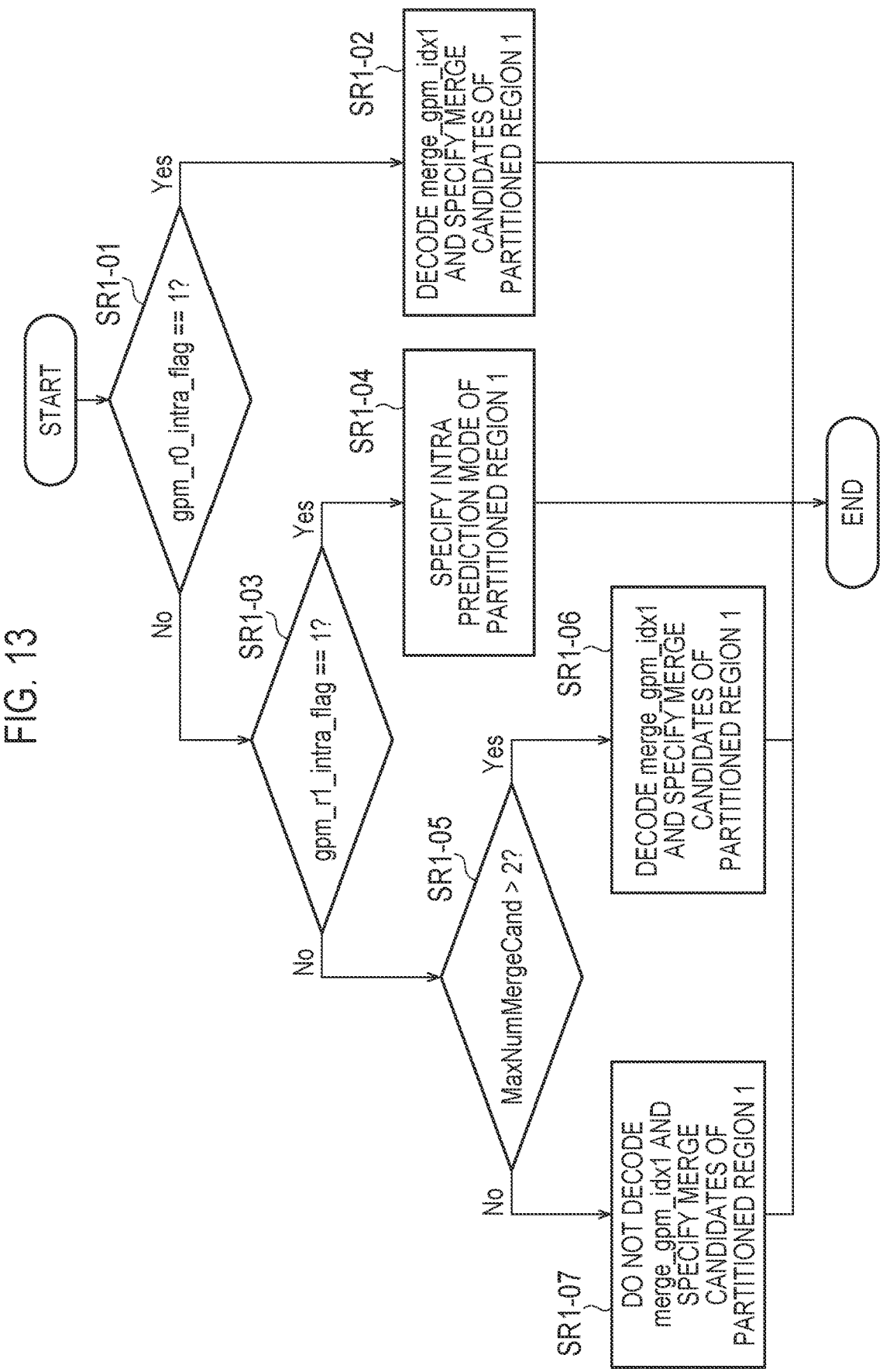
FIG. 13 is a flowchart illustrating an example of a method in which the decoding unit 210 specifies a prediction mode in the partitioned region 1 when there is one type of GPM-applied intra prediction mode.

Hereinafter, a method in which the decoding unit 210 specifies a prediction mode in the partitioned region 1 when there is one type of GPM-applied intra prediction mode will be described with reference to FIG. 13. FIG. 13 is a flowchart illustrating an example of a method in which the decoding unit 210 specifies a prediction mode in the partitioned region 1 when there is one type of GPM-applied intra prediction mode.

As illustrated in FIG. 13, in step SR1-01, the decoding unit 210 determines whether the value of gpm_r0_intra_flag is 1. The decoding unit 210 proceeds to step SR1-02 when such a condition is satisfied, and proceeds to step SR1-03 when such a condition is not satisfied.

In step SR1-02, the decoding unit 210 decodes merge_gpm_idx1, specifies a merge candidate for the partitioned region 1, and ends this processing.

In step SR1-03, the decoding unit 210 determines whether the value of gpm_r1_intra_flag is 1. The decoding unit 210 proceeds to step SR1-04 when such a condition is satisfied, and proceeds to step SR1-05 when such a condition is not satisfied.

In step SR1-04, the decoding unit 210 specifies the intra prediction mode of the partitioned region 1 as one type of intra prediction mode applicable to GPM, and this processing ends.

In step SR1-05, the decoding unit 210 determines whether the value of MaxNumMergeCand is greater than 2. The decoding unit 210 proceeds to step SR1-06 when such a condition is satisfied, and proceeds to step SR1-07 when such a condition is not satisfied.

In step SR1-06, the decoding unit 210 decodes merge_gpm_idx1, specifies a merge candidate for the partitioned region 1, and ends this processing.

In step SR1-07, the decoding unit 210 does not decode merge_gpm_idx1, specifies a merge candidate for the partitioned region 1, and ends this processing.

Here, merge_gpm_idx1 is an index (merge index) that specifies a merge candidate for the partitioned region 1.

When merge_gpm_idx1 does not exist, the decoding unit 210 may infer the value of merge_gpm_idx1 as 0.

Here, in step SR1-07, the decoding unit 210 ends this processing without decoding merge_gpm_idx1. This is intended to avoid unnecessary decoding of merge_gpm_idx1 (reduce the transmission code amount) since it can be specified in step SR1-05 that the value of MaxNumMergeCand is 2, that is, it can be specified that the merge candidate for the partitioned region 1 is a merge candidate different from the merge candidate for the partitioned region 0 specified on the basis of merge_gpm_idx0 among the two merge candidates.

(Method for Specifying Prediction Mode in Partitioned Region 0 when there are Two or More Types of GPM-Applied Intra Prediction Modes)

Figure 14:
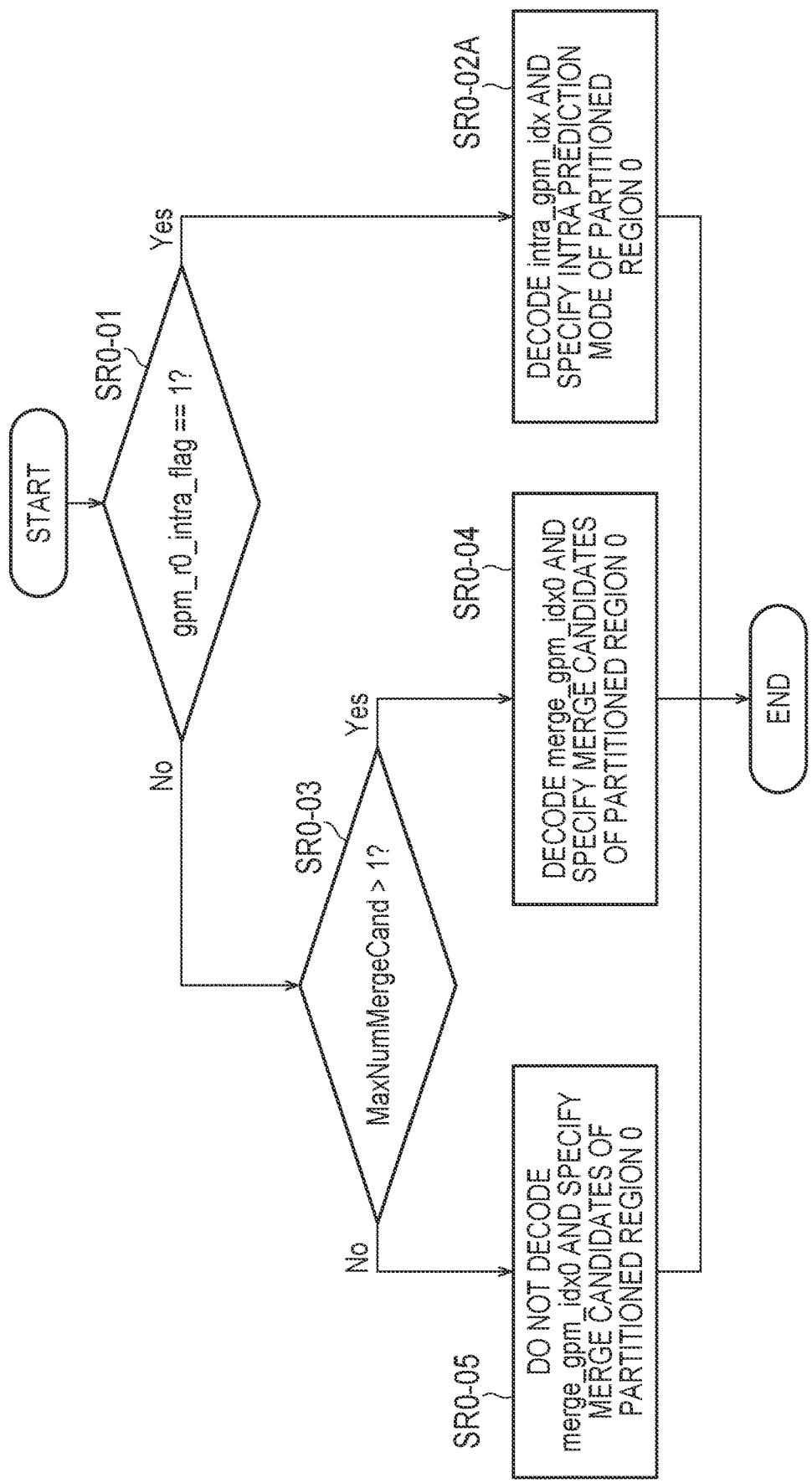
FIG. 14 is a flowchart illustrating an example of a method in which the decoding unit 210 specifies a prediction mode in the partitioned region 0 when there are two or more types of GPM-applied intra prediction mode.

Hereinafter, a method in which the decoding unit 210 specifies a prediction mode in the partitioned region 0 when there are two or more types of GPM-applied intra prediction modes will be described with reference to FIGS. 12 and 14. FIG. 14 is a flowchart illustrating an example of a method in which the decoding unit 210 specifies the prediction mode in the partitioned region 0 when there are two or more types of GPM-applied intra prediction modes.

Here, since the difference between the flowchart illustrated in FIG. 12 and the flowchart illustrated in FIG. 14 is only step SR0-02 and step SR0-02A, only the difference between the two steps will be described.

In the flowchart illustrated in FIG. 12, it is assumed that there is one type of GPM-applied intra prediction mode. In step SR0-02, when the prediction mode of the partitioned region 0 can be specified as the intra prediction mode in step SR001, the decoding unit 210 can uniquely specify that the type of the intra prediction mode is one type of GPM-applied intra prediction mode.

On the other hand, in the flowchart illustrated in FIG. 14, it is assumed that there are two or more types of GPM-applied intra prediction modes. In step SR0-02A, the decoding unit 210 decodes intra_gpm_idx0 since the type of the intra prediction mode of the partitioned region 0 cannot be specified unless intra_gpm_idx0 is decoded even when the prediction mode of the partitioned region 0 can be specified as the intra prediction mode in step SR0-01.

Here, intra_gpm_idx0 is a syntax (eighth syntax) for specifying (controlling) the type of the intra prediction mode in the partitioned region 0.

The variation of the value of intra_gpm_idx0 may be set according to the number of types of intra prediction modes applicable to GPM.

Further, the type of the intra prediction mode corresponding to the value of intra_gpm_idx0 may be set from the selectivity of the intra prediction mode in GPM.

For example, when there are two types of intra prediction modes: a parallel angular mode for the GPM partitioning line L1 and a perpendicular angular mode for the GPM partitioning line L1, the parallel angular mode having a high selectivity among the two types may be set to 0 of the value of intra_gpm_idx0, and the perpendicular angular mode having a low selectivity may be set to 1 of the value of intra_gpm_idx0.

As another example, when there are three types of intra prediction modes, that is, the parallel angular mode for the GPM partitioning line L1, the perpendicular angular mode for the GPM partitioning line L1, and the planar mode, the parallel angular mode may be set to 0 of the value of intra_gpm_idx0, the planar mode may be set to 1 of the value of intra_gpm_idx0, and the perpendicular angular mode may be set to 2 of the value of intra_gpm_idx0 in the descending order of the selectivities.

Furthermore, the value of 0 of intra_gpm_idx corresponding to the parallel angular mode, the value of 1 of intra_gpm_idx corresponding to the planar mode, and the value of 2 of intra_gpm_idx corresponding to the perpendicular angular mode described above may be decoded as a variable-length code based on occurrence probability, namely a unary code, for example, instead of a 2-bit fixed-length code.

Note that, regarding the above-described selectivity, a value confirmed by a simulation experiment using reference software corresponding to the technology disclosed in Non Patent Literature 1 performed by the inventors is referred to, and the designer may change the selectivity according to software to be used, a simulation condition, or a target video sequence.

(Method for Specifying Prediction Mode in Partitioned Region 1 when there are Two or More Types of GPM-Applied Intra Prediction Modes)

Figure 15:
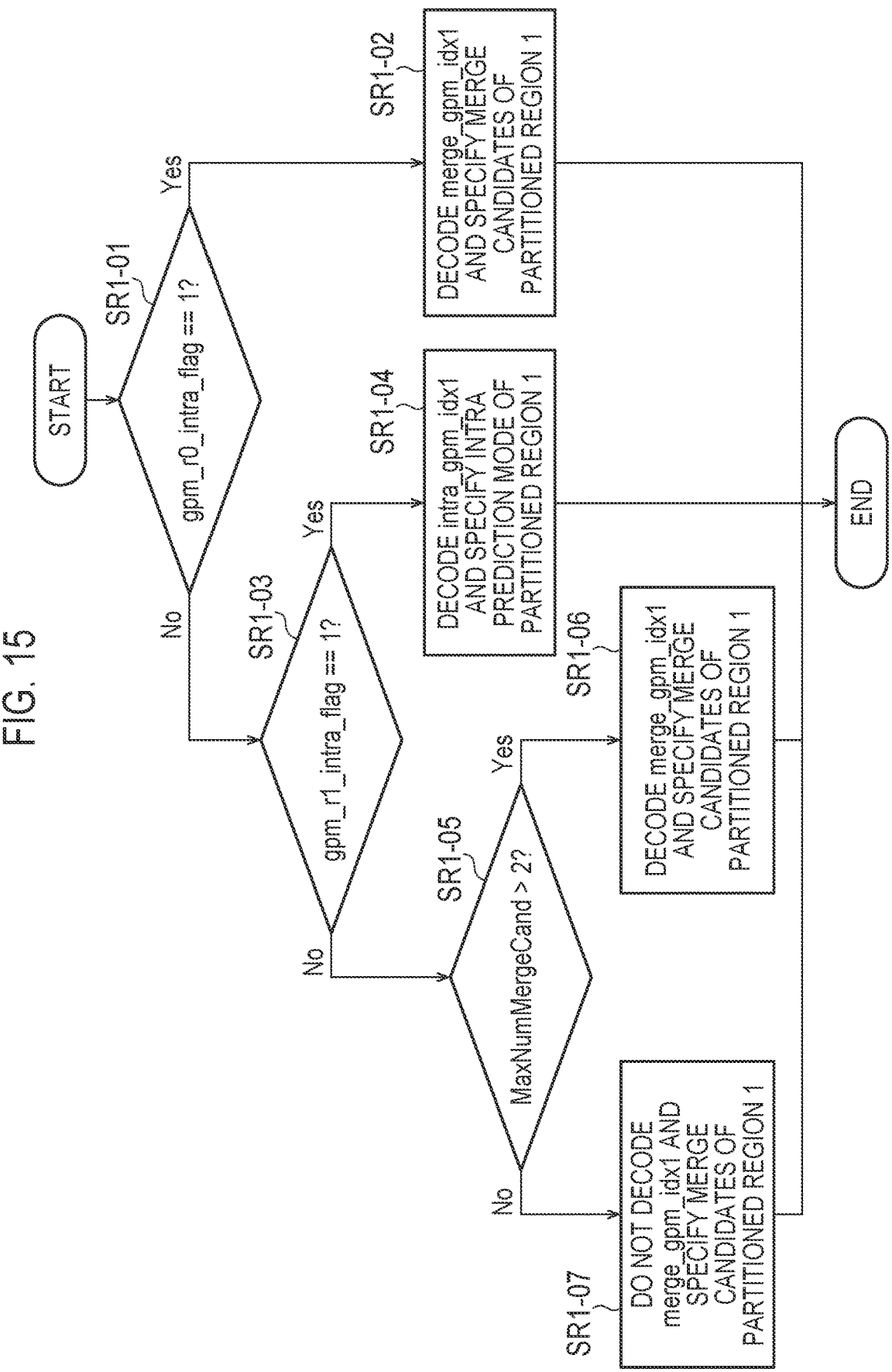
FIG. 15 is a flowchart illustrating an example of a method in which the decoding unit 210 specifies a prediction mode in the partitioned region 1 when there are two or more types of GPM-applied intra prediction modes.

Hereinafter, a method in which the decoding unit 210 specifies a prediction mode in the partitioned region 1 when there are two or more types of GPM-applied intra prediction modes will be described with reference to FIGS. 13 and 15. FIG. 15 is a flowchart illustrating an example of a method in which the decoding unit 210 specifies a prediction mode in the partitioned region 1 when there are two or more types of GPM-applied intra prediction modes.

Here, the difference of the flowchart illustrated in FIG. 15 from the flowchart illustrated in FIG. 13 is that step SR1-04 of the flowchart illustrated in FIG. 13 is replaced with steps SR1-04 in the flowchart illustrated in FIG. 15. Only this difference will be described.

In the flowchart illustrated in FIG. 13, it is assumed that there is one type of GPM-applied intra prediction mode. In step SR1-04, when the prediction mode of the partitioned region 0 can be specified as the intra prediction mode in step SR1-01, the decoding unit 210 can specify that the intra prediction mode is obviously not applied to the partitioned region 1, and thus merge candidates are specified by merge_gpm_idx1.

In a flowchart illustrated in FIG. 15, on the other hand, because it is assumed that there are two or more types of GPM-applied intra prediction mode, even if the prediction mode of the partitioned region 1 can be specified as the intra prediction mode in step SR1-03, the decoding unit 210 cannot specify whether the prediction mode of the partitioned region 1 is the intra prediction mode unless intra_gpm_idx is decoded.

In step SR1-4', the decoding unit 210 decodes intra_gpm_idx, specifies the type of intra prediction mode for the partitioned region 1, and ends the processing.

The decoding unit 210 sends the following information in the decoding target sequence and the decoding target block specified by the methods described above with reference to FIGS. 7 to 15 to the inter prediction unit 241, the intra prediction unit 242, and the blending unit 243. Therefore, in the image decoding device 200, whether the GPM can be applied to the decoding target block and the type of prediction mode for each partitioned region when the GPM is applied are appropriately specified on an assumption that a GPM configured by two different intra prediction modes is prohibited, whereby further improvement in the coding performance by the GPM can be expected.

(Combined Use of Intra Prediction for GPM, Merge with Motion Vector Difference for GPM, and Template Matching for GPM)

Control methods in a case where combined use of intra prediction for the GPM (hereinafter referred to as GPM+Intra), merge with motion vector difference (MMVD) for the GPM (hereinafter referred to as GPM+MMVD), and template matching (TM) for the GPM (hereinafter referred to as GPM+TM) by the decoding unit 210 is taken into consideration will be described hereinafter with reference to FIGS. 16 to 23.

Here, GPM+MMVD and GPM+TM are techniques disclosed in Non Patent Reference 2, and both modify MVs used in motion compensation in partitioned regions of the GPM and then perform the motion compensation.

That is, since GPM+MMVD and GPM+TM are applied to partitioned regions of the inter prediction (motion compensation) of the GPM, GPM+MMVD and GPM+TM are not applied to partitioned regions in which GPM+Intra is valid. In Non Patent Reference 2, since control methods in a case where GPM+Intra is used in combination with GPM+MMVD or GPM+TM are not defined, such control methods will be described hereinafter.

Figure 16:
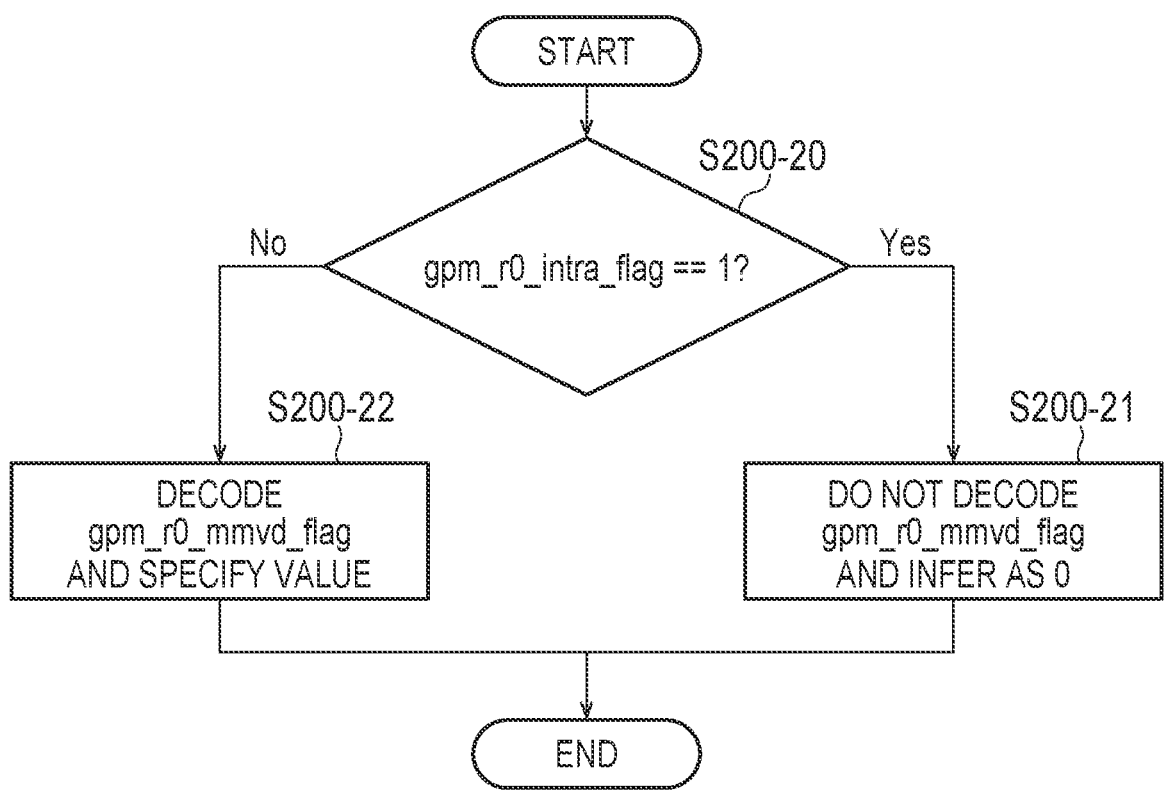
FIG. 16 is a flowchart illustrating a method in which the decoding unit 210 determines whether to apply merge with motion vector difference to the partitioned region 0 in accordance with whether to apply the intra prediction mode to the partitioned region 0.

FIG. 16 is a flowchart illustrating an example of a method in which the decoding unit 210 determines applicability of GPM+MMVD to the partitioned region 0 in accordance with applicability of GPM+Intra to the partitioned region 0.

As illustrated in FIG. 16, in step S200-20, the decoding unit 210 determines whether the value of gpm_r0_intra_flag is 1. The decoding unit 210 proceeds to step S200-21 if the condition is satisfied, and proceeds to step S200-22 if the condition is not satisfied.

In step S200-21, the decoding unit 210 infers the value of gpm_r0_mmvd_flag included in the control data to be 0 without decoding gpm_r0_mmvd_flag, and ends the processing. In step S200-22, the decoding unit 210 decodes gpm_r0_mmvd_flag included in the control data, specifies the value of gpm_r0_mmvd_flag, and ends the processing.

Here, gpm_r0_mmvd_flag is syntax (fifth syntax) for determining whether or not the MMVD is valid in the partitioned region 0, which is partitioned in the geometric partitioning mode of the decoding target block.

When the value of gpm_r0_mmvd_flag is 1, the decoding unit 210 can determine that the MMVD is applied (valid) to the partitioned region 0, and when the value of gpm_r0_mmvd_flag is 0, the decoding unit 210 can determine that the MMVD is not applied (invalid) to the partitioned region 0.

Note that, in a case where gpm_r0_mmvd_flag does not exist, the decoding unit 210 may infer the value of gpm_r0_mmvd_flag to be 0.

Figure 17:
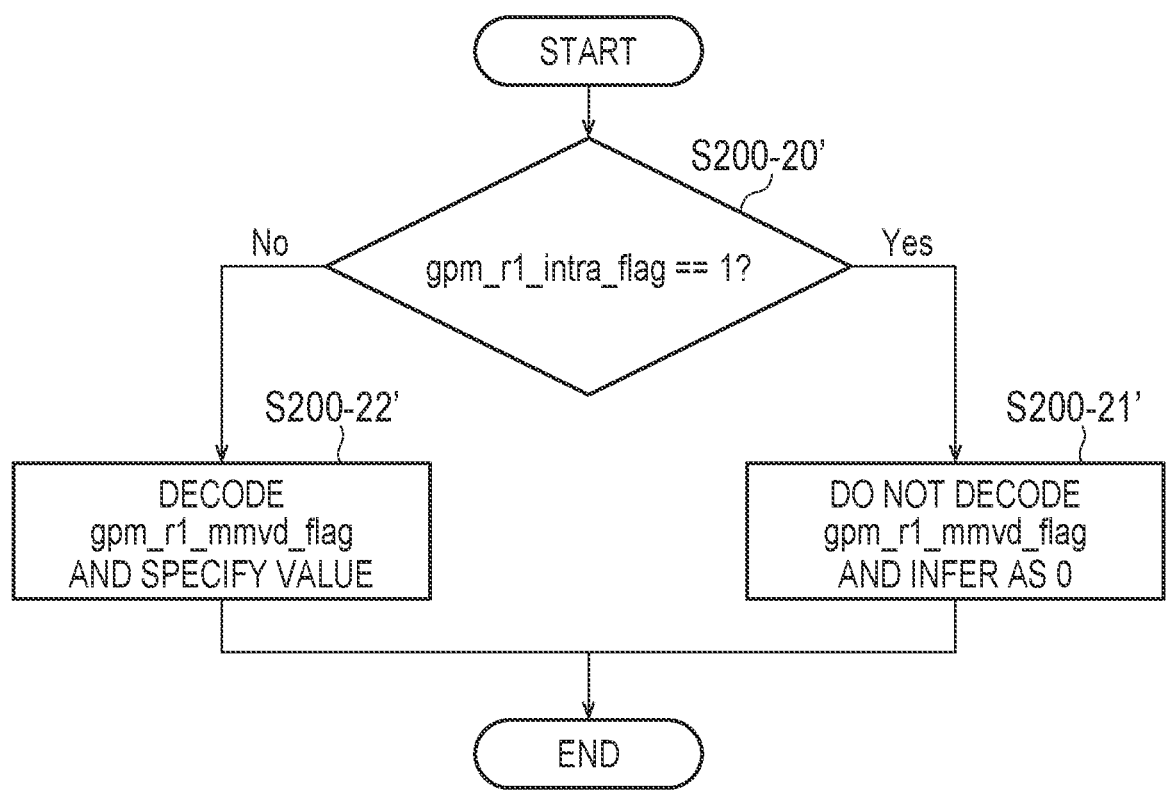
FIG. 17 is a flowchart illustrating a method in which the decoding unit 210 determines whether to apply the merge with motion vector difference to the partitioned region 1 in accordance with whether to apply the intra prediction mode to the partitioned region 1.

FIG. 17 is a flowchart illustrating an example of a method in which the decoding unit 210 determines applicability of GPM+MMVD to the partitioned region 1 in accordance with applicability of GPM+Intra to the partitioned region 1.

As illustrated in FIG. 17, in step S200-20', the decoding unit 210 determines whether the value of gpm_r1_intra_flag is 1. The decoding unit 210 proceeds to step S200-21' if the condition is satisfied, and proceeds to step S200-22' if the condition is not satisfied.

In step S200-21', the decoding unit 210 infers the value of gpm_r1_mmvd_flag included in the control data to be 0 without decoding gpm_r1_mmvd_flag, and ends the processing. In step S200-22', the decoding unit 210 decodes gpm_r1_mmvd_flag included in the control data, specifies the value of gpm_r1_mmvd_flag, and ends the processing.

Here, gpm_r1_mmvd_flag is syntax (sixth syntax) for determining whether or not the MMVD is valid in the partitioned region 1, which is partitioned in the geometric partitioning mode of the decoding target block.

When the value of gpm_r1_mmvd_flag is 1, the decoding unit 210 can determine that the MMVD is applied (valid) to the partitioned region 1, and when the value of gpm_r1_mmvd_flag is 0, the decoding unit 210 can determine that the MMVD is not applied (invalid) to the partitioned region 1.

Note that, in a case where gpm_r1_mmvd_flag does not exist, the decoding unit 210 may infer the value of gpm_r1_mmvd_flag to be 0.

Figure 18:
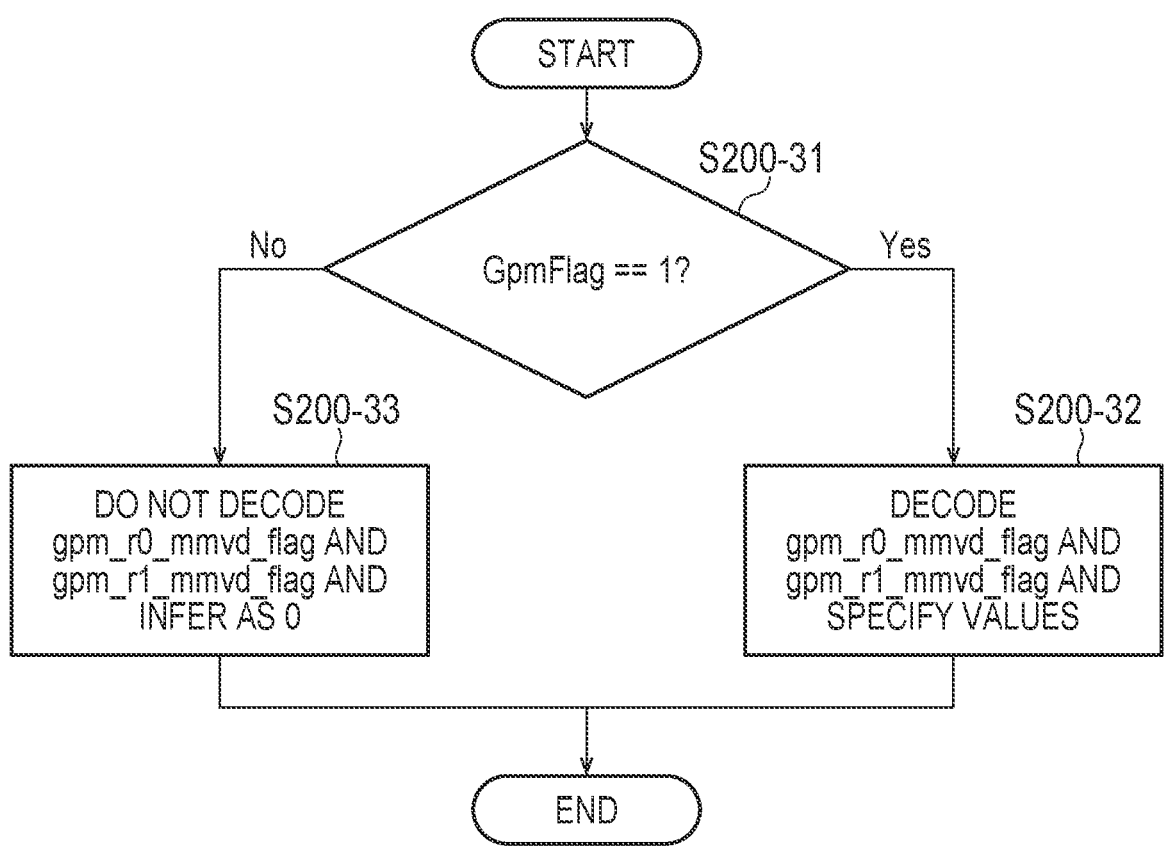
FIG. 18 is a flowchart illustrating a method in which the decoding unit 210 determines whether to apply the merge with motion vector difference to the partitioned region 0 and the partitioned region 1 in accordance with whether to apply the geometric partitioning mode.
Figure 19:
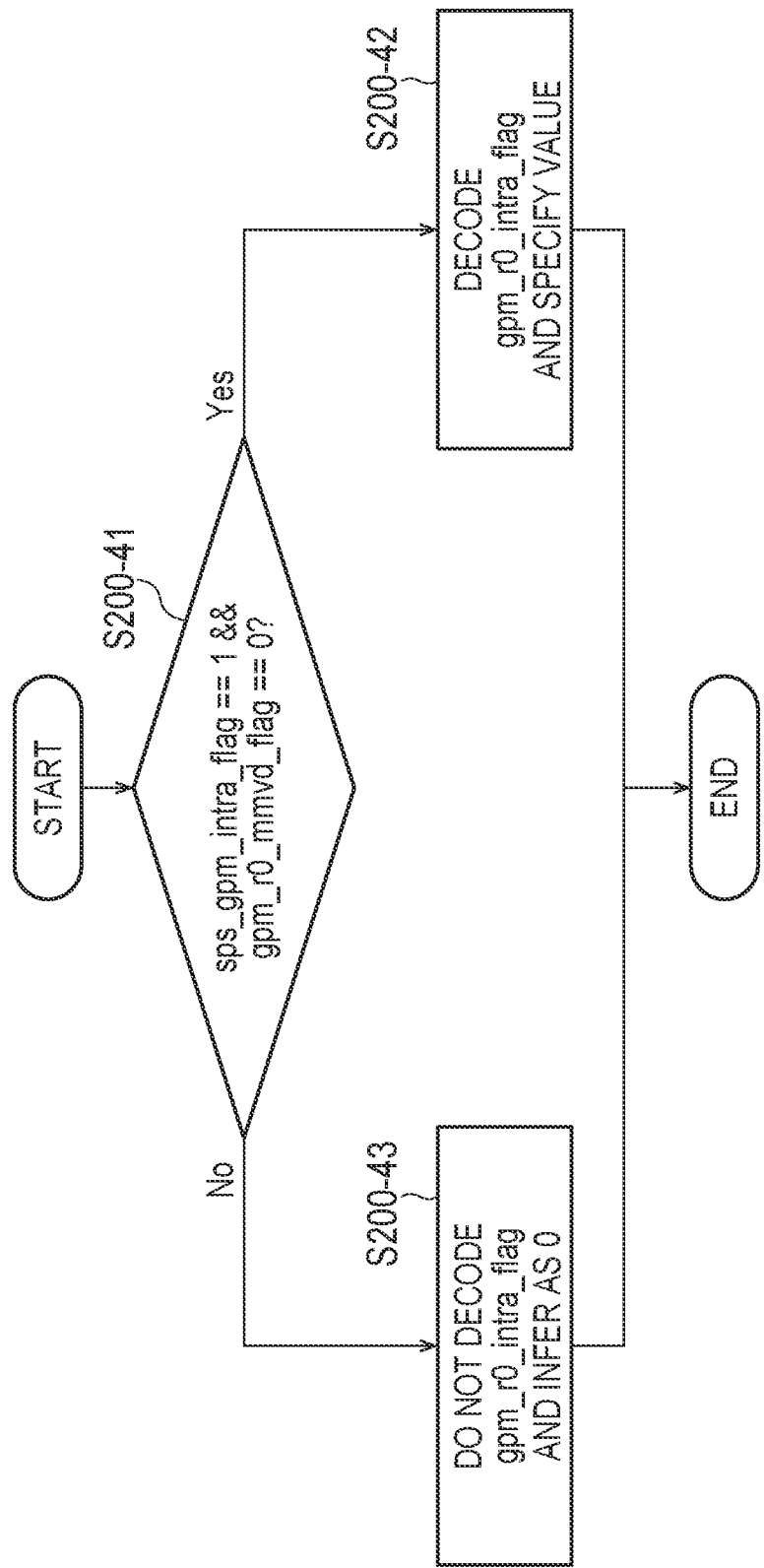
FIG. 19 is a flowchart illustrating a method in which the decoding unit 210 determines whether to apply the intra prediction mode to the partitioned region 0 in accordance with whether to apply the merge with motion vector difference to the partitioned region 0.
Figure 20:
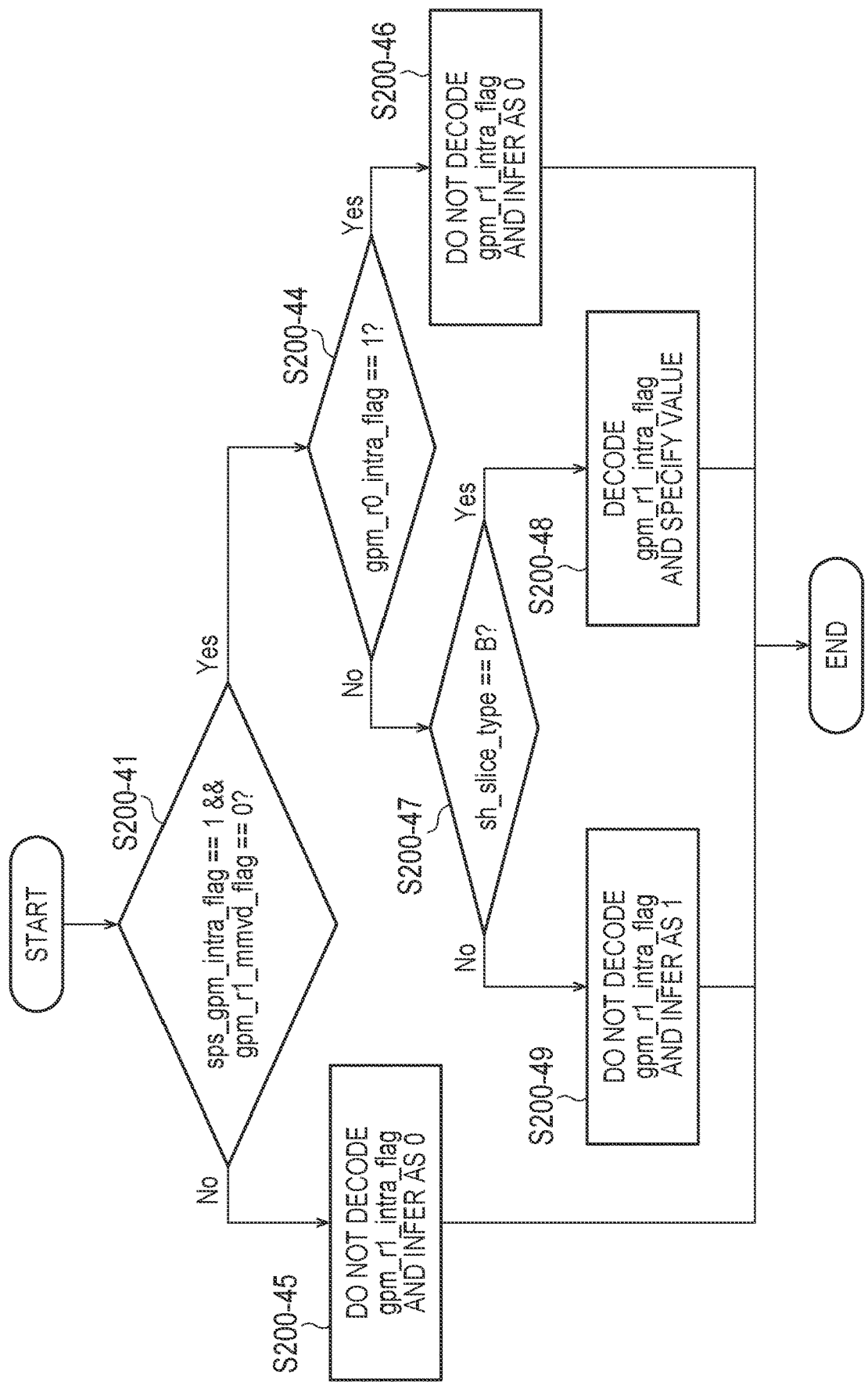
FIG. 20 is a flowchart illustrating a method in which the decoding unit 210 determines whether to apply the intra prediction mode to the partitioned region 1 in accordance with whether to apply the merge with motion vector difference to the partitioned region 1 and whether to apply the intra prediction mode to the partitioned region 0.

FIGS. 18 to 20 are examples of flowcharts illustrating modifications of the control methods at a time when GPM+MMVD and GPM+Intra, which can be implemented as FIGS. 10, 11, 16, and 17 described above, are used in combination.

FIG. 18 is an example of a flowchart for determining the values of gpm_r0_mmvd_flag and gpm_r1_mmvd_flag in accordance with the value of GpmFlag.

As illustrated in FIG. 18, in step S200-31, the decoding unit 210 determines whether the value of GpmFlag is 1. The decoding unit 210 proceeds to step S200-32 if the condition is satisfied, and proceeds to step S200-33 if the condition is not satisfied.

In step S200-32, the decoding unit 210 infers the values of gpm_r0_mmvd_flag and gpm_r1_mmvd_flag included in the control data by decoding gpm_r0_mmvd_flag and gpm_r1_mmvd_flag, and ends the processing. In step S200-33, the decoding unit 210 infers the values of gpm_r0_mmvd_flag and gpm_r1_mmvd_flag included in the control data to be 0 without decoding gpm_r0_mmvd_flag and gpm_r1_mmvd_flag, and ends the processing.

FIG. 19 is a flowchart illustrating an example of a method in which the decoding unit 210 determines applicability of GPM+Intra to the partitioned region 0 in accordance with applicability of GPM+MMVD to the partitioned region 0. A difference from the flowchart illustrated in FIG. 16 is that the control method and the control target are reversed. That is, in this configuration, gpm_r0_mmvd_flag and gpm_r1 mmvd_flag are decoded before gpm_r0_intra_flag and gpm_r1_intra_flag.

As illustrated in FIG. 19, in step S200-41, the decoding unit 210 determines whether the value of sps_gpm_intra_flag is 1 and the value of gpm_r0_mmvd_flag is 0. The decoding unit 210 proceeds to step S200-42 if the condition is satisfied, and proceeds to step S200-43 if the condition is not satisfied.

In step S200-42, the decoding unit 210 specifies the value of gpm_r0_intra_flag included in the control data by decoding gpm_r0_intra_flag, and ends the processing. In step S200-43, the decoding unit 210 infers the value of gpm_r0_intra_flag included in the control data to be 0 without decoding gpm_r0_intra_flag, and ends the processing.

FIG. 20 is a flowchart illustrating an example of a method in which the decoding unit 210 determines applicability of GPM+Intra to the partitioned region 1 in accordance with applicability of GPM+MMVD to the partitioned region 1. A difference from the flowchart illustrated in FIG. 17 is that the control method and the control target are reversed. That is, in this configuration, gpm_r0_mmvd_flag and gpm_r1_mmvd_flag are decoded before gpm_r0_intra_flag and gpm_r1_intra_flag.

As illustrated in FIG. 20, in step S200-41, the decoding unit 210 determines whether the value of sps_gpm_intra_flag is 1 and the value of gpm_r0 mmvd_flag is 0. The decoding unit 210 proceeds to step S200-44 if the condition is satisfied, and proceeds to step S200-45 if the condition is not satisfied.

In step S200-44, the decoding unit 210 determines whether gpm_r0_mmvd_flag is 1. The decoding unit 210 proceeds to step S200-46 if the condition is satisfied, and proceeds to step S200-47 if the condition is not satisfied.

In step S200-45, the decoding unit 210 infers the value of gpm_r1_intra_flag included in the control data to be 0 without decoding gpm_r1_intra_flag, and ends the processing. In step S200-46, the decoding unit 210 infers the value of gpm_r1_intra_flag included in the control data to be 0 without decoding gpm_r1_intra_flag, and ends the processing.

In step S200-47, the decoding unit 210 determines whether sh_slice_type is B. The decoding unit 210 proceeds to step S200-48 if the condition is satisfied, and proceeds to step S200-49 if the condition is not satisfied.

In step S200-48, the decoding unit 210 specifies the value of gpm_r1_intra_flag included in the control data by decoding gpm_r1_intra_flag, and ends the processing. In step S200-49, the decoding unit 210 infers the value of gpm_r1_intra_flag included in the control data to be 0 without decoding gpm_r1_intra_flag, and ends the processing.

Figure 21:
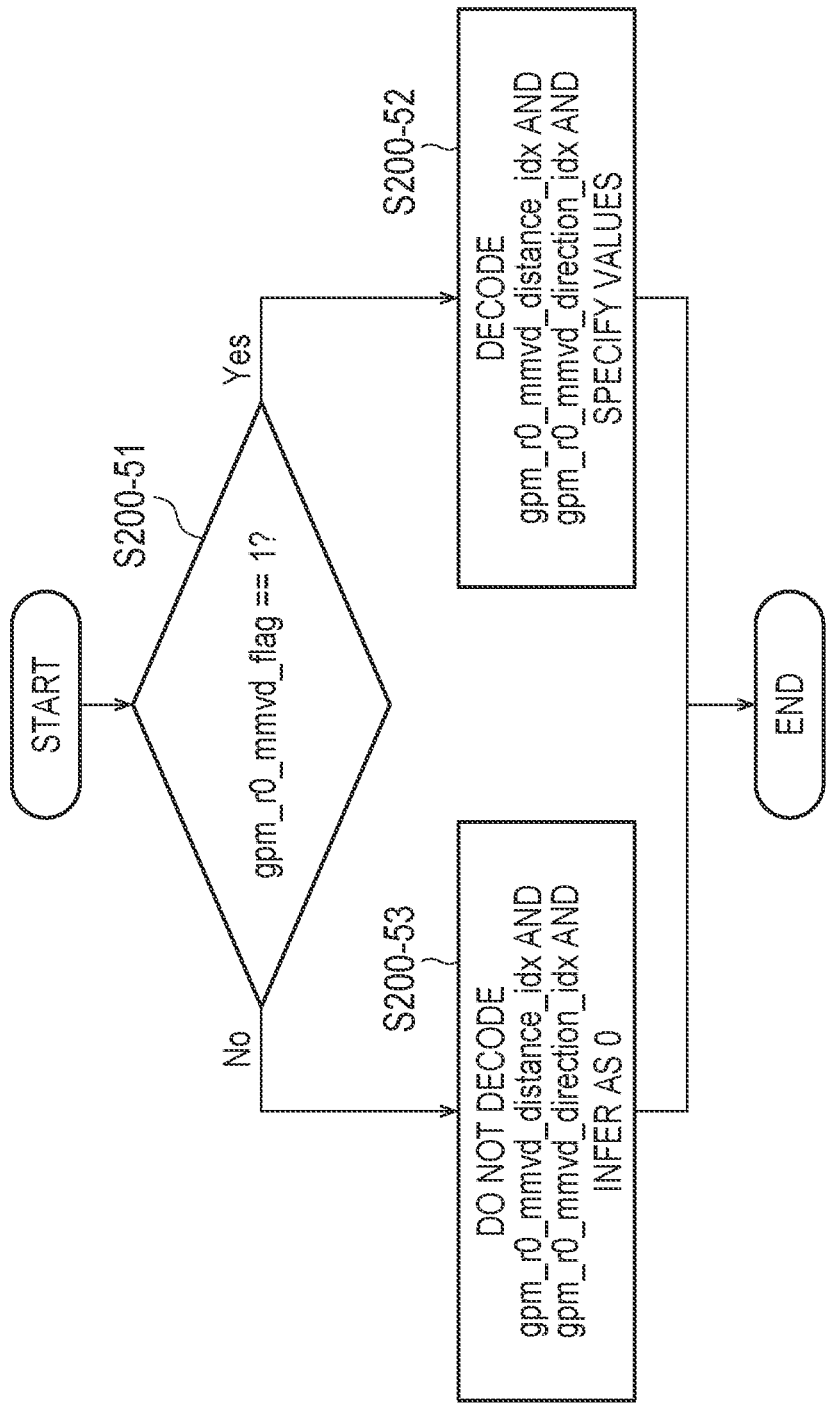
FIG. 21 is a flowchart illustrating a method in which the decoding unit 210 determines a distance and a direction of the merge with motion vector difference in the partitioned region 0 in accordance with whether to apply the merge with motion vector difference to the partitioned region 0.

FIG. 21 is a flowchart illustrating an example of a method of specifying gpm_r0_mmvd_direction_idx and gpm_r0_mmvd_distance_idx, which are syntaxes that specify a direction and a distance of an MV corrected by GPM+MMVD in accordance with applicability of GPM+MMVD to the partitioned region 0.

As illustrated in FIG. 21, in step S200-51, the decoding unit 210 determines whether the value of gpm_r0_mmvd_flag is 1. The decoding unit 210 proceeds to step S200-52 if the condition is satisfied, and proceeds to step S200-53 if the condition is not satisfied.

In step S200-52, the decoding unit 210 specifies the values of gpm_r0_mmvd_direction_idx and gpm_r0_mmvd_distance_idx included in the control data by decoding gpm_r0_mmvd_direction_idx and gpm_r0_mmvd_distance_idx, and ends the processing. In step S200-53, the decoding unit 210 infers the values of gpm_r0_mmvd_direction_idx and gpm_r0_mmvd_distance_idx included in the control data to be 0 without decoding gpm_r0_mmvd_direction_idx and gpm_r0 mmvd_distance_idx, and ends the processing.

Here, gpm_r0_mmvd_direction_idx and gpm_r0 mmvd_distance_idx are syntaxes (seventh syntax and eighth syntax) that specify a direction and a distance, respectively, of an MV corrected by GPM+MMVD as described above. Meanings of each of these syntaxes indicated by values other than 0 can have the same configuration as that in Non Patent Reference 2, and detailed description thereof is omitted.

Figure 22:
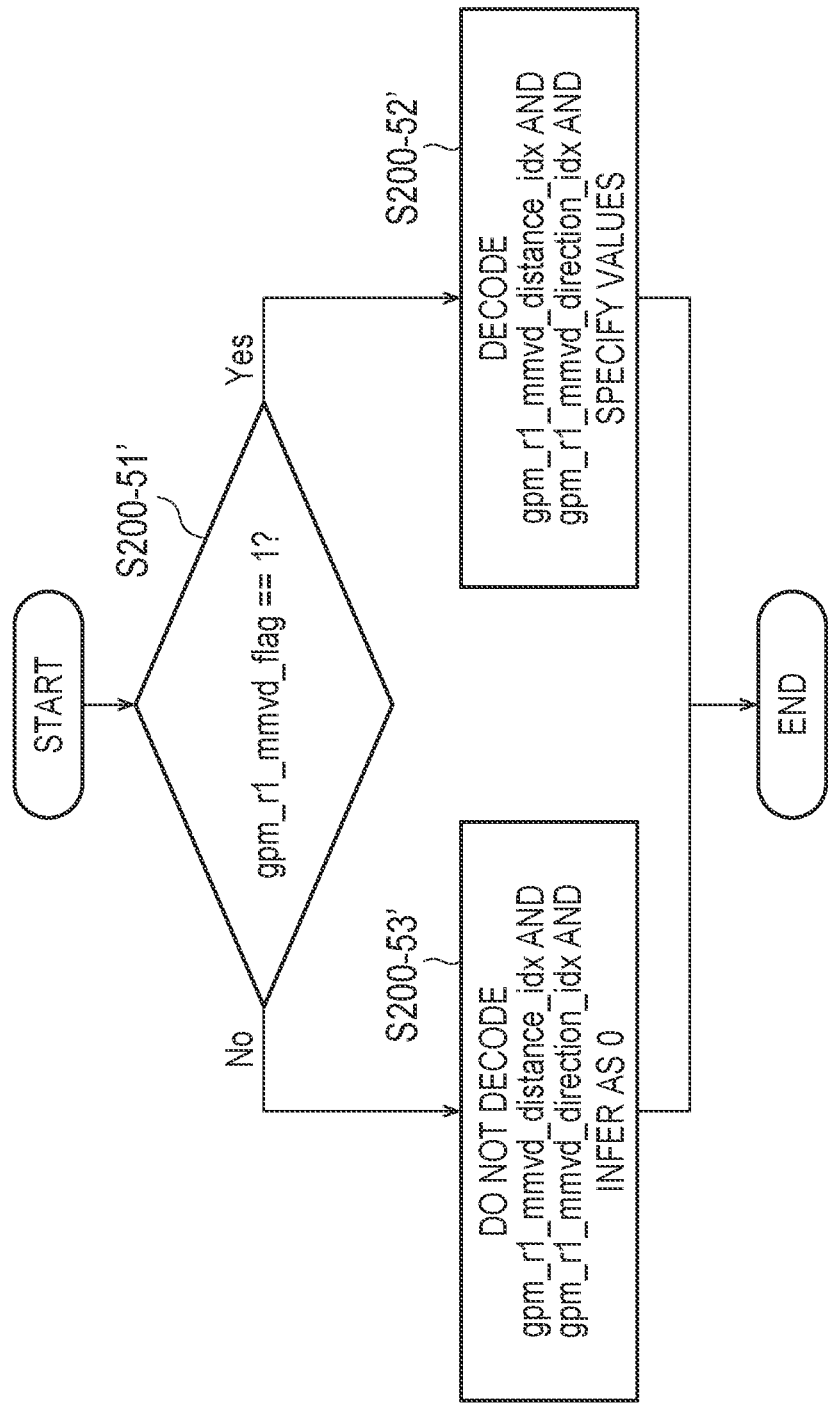
FIG. 22 is a flowchart illustrating a method in which the decoding unit 210 determines a distance and a direction of the merge with motion vector difference in the partitioned region 1 in accordance with whether to apply the merge with motion vector difference to the partitioned region 1.

FIG. 22 is a flowchart illustrating an example of a method of specifying gpm_r1_mmvd_direction_idx and gpm_r1_mmvd_distance_idx, which are syntaxes that specify a direction and a distance of an MV corrected by GPM+MMVD in accordance with applicability of GPM+MMVD to the partitioned region 1.

As illustrated in FIG. 21, in step S200-51', the decoding unit 210 determines whether the value of gpm_r1_mmvd_flag is 1. The decoding unit 210 proceeds to step S200-52' if the condition is satisfied, and proceeds to step S200-53' if the condition is not satisfied.

In step S200-52', the decoding unit 210 specifies the values of gpm_r1_mmvd_direction_idx and gpm_r1_mmvd_distance_idx included in the control data by decoding gpm_r1_mmvd_direction_idx and gpm_r1_mmvd_distance_idx, and ends the processing. In step S200-53', the decoding unit 210 infers the values of gpm_r1_mmvd_direction_idx and gpm_r1 mmvd_distance_idx included in the control data to be 0 without decoding gpm_r1_mmvd_direction_idx and gpm_r1_mmvd_distance_idx, and ends the processing.

Here, gpm_r1_mmvd_direction_idx and gpm_r1_mmvd_distance_idx are syntaxes (ninth syntax and tenth syntax) that specify a direction and a distance, respectively, of an MV corrected by GPM+MMVD as described above. Meanings of each of these syntaxes indicated by values other than 0 can have the same configuration as that in Non Patent Reference 2, and detailed description thereof is omitted.

Figure 23:
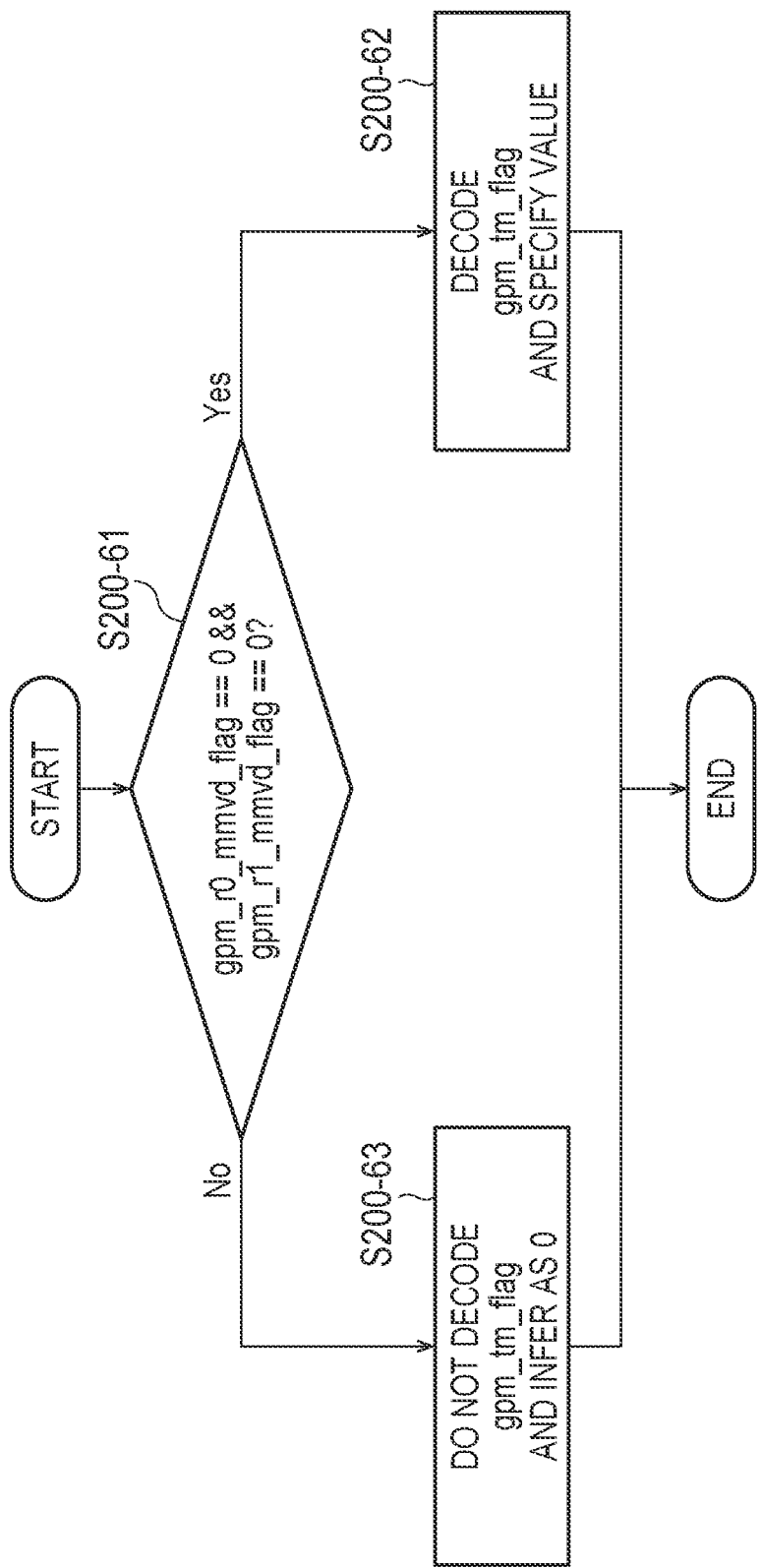
FIG. 23 is a flowchart illustrating a method in which the decoding unit 210 determines whether to apply template matching in accordance with whether to apply the merge with motion vector difference to the partitioned region 0 and the partitioned region 1.

FIG. 23 is a flowchart illustrating an example of a method for determining applicability of GPM+TM to the partitioned region 0 and the partitioned region 1 in accordance with applicability of GPM+MMVD to the partitioned region 0 and the partitioned region 1.

As illustrated in FIG. 23, in step S200-61, the decoding unit 210 determines whether the value of gpm_r0_mmvd_flag is 0 and the value of gpm_r1_mmvd_flag is 0. The decoding unit 210 proceeds to step S200-62 if the condition is satisfied, and proceeds to step S200-63 if the condition is not satisfied.

In step S200-62, the decoding unit 210 specifies the value of gpm_tm_flag included in the control data by decoding gpm_tm_flag, and ends the processing. In step S200-63, the decoding unit 210 infers the value of gpm_tm_flag included in the control data to be 0 without decoding gpm_tm_flag, and ends the processing.

Here, gpm_tm_flag is syntax (eleventh syntax) for determining whether or not the TM is valid in the partitioned region 0 and the partitioned region 1, which are partitioned in the geometric partitioning mode of the decoding target.

When the value of gpm_tm_flag is 1, the decoding unit 210 can determine that the TM is applied (valid) to the partitioned region 0 and the partitioned region 1, and when the value of gpm_tm_flag is 0, the decoding unit 210 can determine that the TM is not applied (invalid) to the partitioned region 0 and the partitioned region 1.

Note that, in a case where gpm_tm_flag does not exist, the decoding unit 210 may infer the value of gpm_tm_flag to be 0.

By employing the above-described control methods for applicability in consideration of the combined use of GPM+Intra and GPM+MMVD or GPM+Intra, GPM+MMVD, and GPM+TM, improvement in the coding performance can be expected as a result of additive improvement in the prediction performance achieved by GPM+Intra, GPM+MMVD, and GPM+TM.

(Exclusive Use of Merge with Motion Vector Difference and Template Matching for GPM)

Control methods in a case where exclusive use of GPM+Intra, GPM+MMVD, and GPM+TM by the decoding unit 210 is taken into consideration will be described hereinafter with reference to FIGS. 24 to 26.

The exclusive use of GPM+Intra, GPM+MMVD, and GPM+TM is, in contrast to the above-described combined use, a configuration in which both GPM+MMVD and GPM+TM are not applied to a decoding target block to which GPM+Intra is applied.

Similarly, the exclusive use is a configuration in which GPM+Intra is not applied to a decoding target block to which either GPM+MMVD or GPM+TM is applied. The exclusive use, therefore, can be achieved by employing a configuration in which the methods for decoding gpm_r1_intra_flag, gpm_r1_mmvd_flag, and gpm_tm_flag described above on the premise of combined use are modified as follows.

Figure 24:
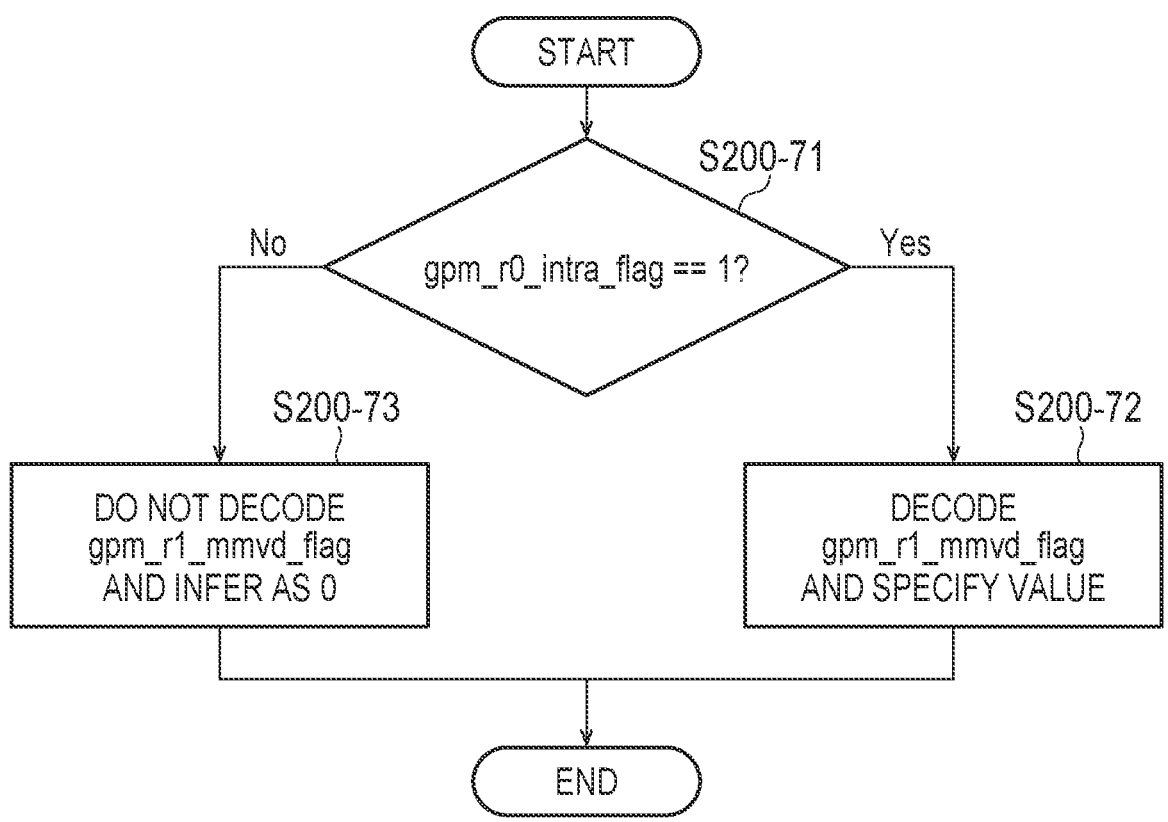
FIG. 24 is a flowchart illustrating a method in which the decoding unit 210 determines whether to apply the merge with motion vector difference to the partitioned region 1 in accordance with whether to apply the intra prediction mode to the partitioned region 0.

FIG. 24 is a flowchart illustrating an example of a method for determining applicability of GPM+MMDV to the partitioned region 1 in accordance with applicability of GPM+Intra to the partitioned region 0.

As illustrated in FIG. 24, in step S200-71, the decoding unit 210 determines whether the value of gpm_r0_intra_flag is 1. The decoding unit 210 proceeds to step S200-72 if the condition is satisfied, and proceeds to step S200-73 if the condition is not satisfied.

In step S200-72, the decoding unit 210 specifies the value of gpm_r1_mmvd_flag included in the control data by decoding gpm_r1_mmvd_flag, and ends the processing. In step S200-73, the decoding unit 210 infers the value of gpm_r1_mmvd_flag included in the control data to be 0 without decoding gpm_r1_mmvd_flag, and ends the processing.

Figure 25:
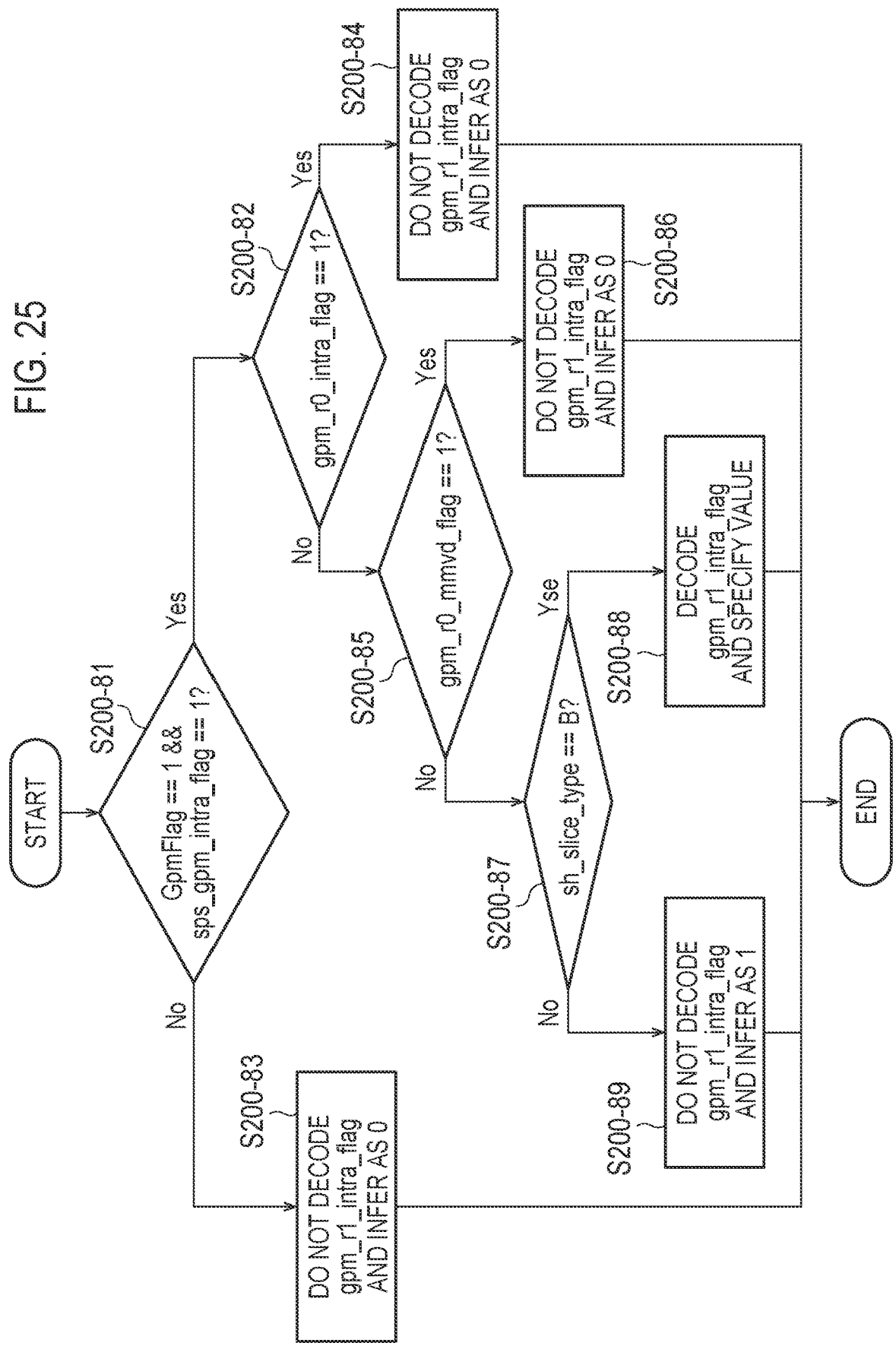
FIG. 25 is a flowchart illustrating a method in which the decoding unit 210 determines whether to apply the merge with motion vector difference to the partitioned region 1 in accordance with whether to apply the intra prediction mode to the partitioned region 0 and whether to apply the merge with motion vector difference to the partitioned region 0.

FIG. 25 is a flowchart illustrating an example of a method for determining applicability of GPM+Intra to the partitioned region 1 in accordance with applicability of GPM+Intra to the partitioned region 0 and applicability of GPM+MMVD to the partitioned region 0.

As illustrated in FIG. 25, in step S200-81, the decoding unit 210 determines whether the value of GpmFlag is 1 and the value of sps_gpm_intra_flag is 1. The decoding unit 210 proceeds to step S200-82 if the condition is satisfied, and proceeds to step S200-83 if the condition is not satisfied.

In step S200-82, the decoding unit 210 determines whether gpm_r0_mmvd_flag is 1. The decoding unit 210 proceeds to step S200-84 if the condition is satisfied, and proceeds to step S200-85 if the condition is not satisfied.

In step S200-83, the decoding unit 210 infers the value of gpm_r1_intra_flag included in the control data to be 0 without decoding gpm_r1_intra_flag, and ends the processing. In step S200-84, the decoding unit 210 infers the value of gpm_r1_intra_flag included in the control data to be 0 without decoding gpm_r1 intra_flag, and ends the processing.

In step S200-85, the decoding unit 210 determines whether gpm_r0_mmvd_flag is 1. The decoding unit 210 proceeds to step S200-86 if the condition is satisfied, and proceeds to step S200-87 if the condition is not satisfied.

In step S200-86, the decoding unit 210 infers the value of gpm_r1_intra_flag included in the control data to be 0 without decoding gpm_r1_intra_flag, and ends the processing.

In step S200-87, the decoding unit 210 determines whether sh_slice_type is B. The decoding unit 210 proceeds to step S200-88 if the condition is satisfied, and proceeds to step S200-89 if the condition is not satisfied.

In step S200-88, the decoding unit 210 specifies the value of gpm_r1_intra_flag included in the control data by decoding gpm_r1_intra_flag, and ends the processing. In step S200-89, the decoding unit 210 infers the value of gpm_r1_intra_flag included in the control data to be 0 without decoding gpm_r1_intra_flag, and ends the processing.

Figure 26:
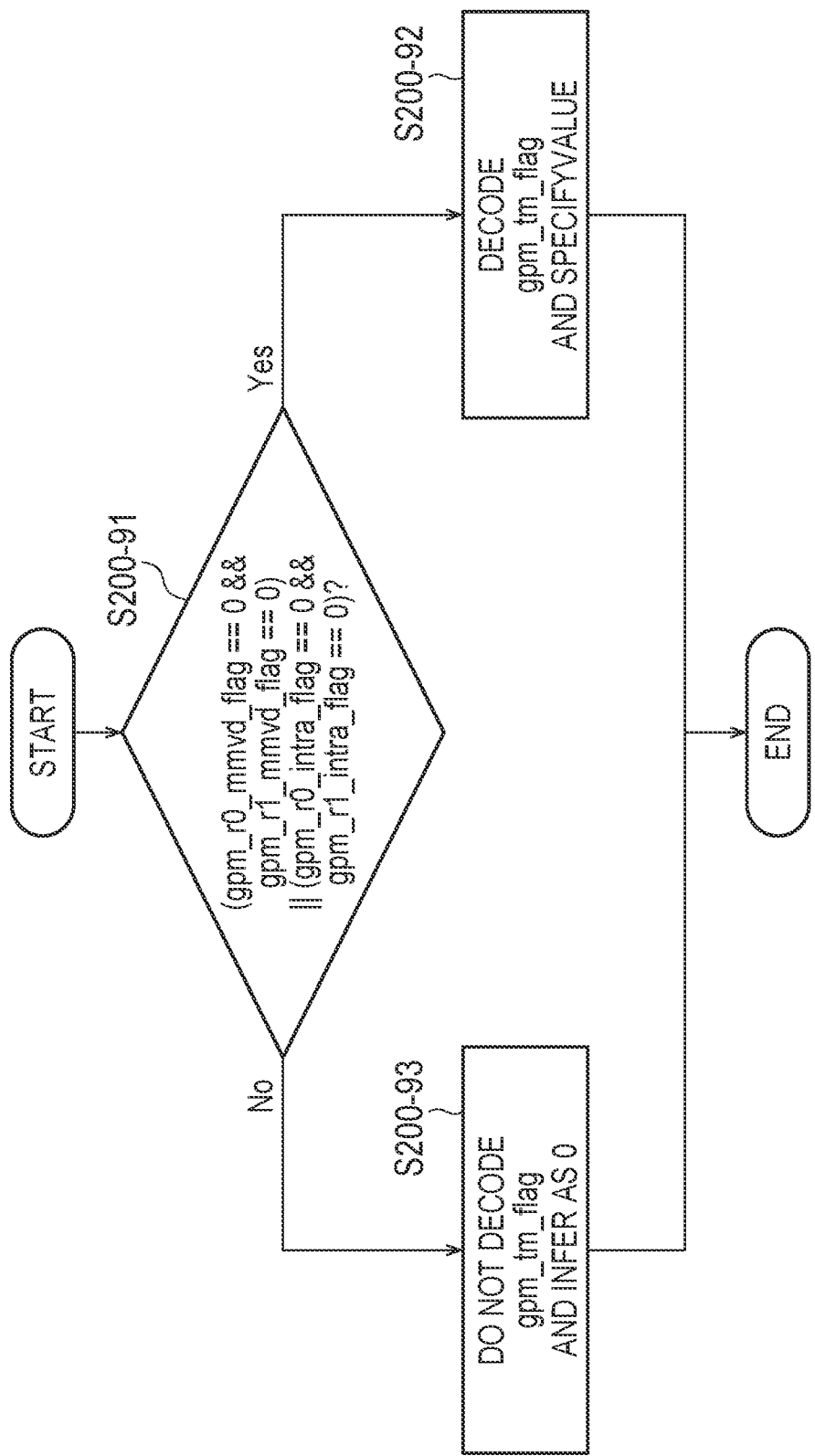
FIG. 26 is a flowchart illustrating a method for determining whether to apply the template matching in accordance with whether the decoding unit 210 applies the merge with motion vector difference to the partitioned region 0 and the partitioned region 1 or whether the decoding unit 210 applies the intra prediction mode to the partitioned region 0 and the partitioned region 1.

FIG. 26 is a flowchart illustrating an example of a method for determining applicability of GPM+TM to the partitioned region 0 and the partitioned region 1 in accordance with applicability of GPM+MMVD to the partitioned region 0 and the partitioned region 1 or applicability of GPM+Intra to the partitioned region 0 and the partitioned region 1.

As illustrated in FIG. 26, in step S200-91, the decoding unit 210 determines whether the value of gpm_r0_mmvd_flag is 0 and the value of gpm_r1_mmvd_flag is 0, or whether the value of gpm_r0_Intra_flag is 0 and the value of gpm_r1_mmvd_flag is 0. The decoding unit 210 proceeds to step S200-92 if the condition is satisfied, and proceeds to step S200-93 if the condition is not satisfied.

In step S200-92, the decoding unit 210 specifies the value of gpm_tm_flag included in the control data by decoding gpm_tm_flag, and ends the processing. In step S200-93, the decoding unit 210 infers the value of gpm_tm_flag included in the control data to be 0 without decoding gpm_tm_flag, and ends the processing.

By employing the above-described control methods for applicability in consideration of the exclusive use of GPM+Intra and GPM+MMVD or GPM+Intra, GPM+MMVD, and GPM+TM, improvement in the coding performance can be expected as a result of additive improvement in the prediction performance achieved by GPM+Intra, GPM+MMVD, and GPM+TM.

Further, the image encoding device 100 and the image decoding device 200 may be realized as a program causing a computer to execute each function (each step).

Note that the above described embodiments have been described by taking application of the present invention to the point cloud encoding device 10 and the point cloud decoding device 30 as examples. However, the present invention is not limited only thereto, but can be similarly applied to an encoding/decoding system having functions of the encoding device 10 and the decoding device 30.

According to the present embodiment, it is possible to improve the overall quality of service in video communications, thereby contributing to Goal 9 of the UN-led Sustainable Development Goals (SDGs) which is to "build resilient infrastructure, promote inclusive and sustainable industrialization and foster innovation".

What is claimed is:

1. An image decoding device comprising a circuit, wherein the circuit executes control to:
    decode a first syntax that controls applicability of a geometric partitioning mode of a decoding target sequence;
    control, in accordance with a value of the first syntax, whether or not to decode a second syntax that controls applicability of an intra prediction mode to the geometric partitioning mode of the decoding target sequence;
    not decode a fourth syntax that specifies whether or not a prediction mode of a partitioned region 1 partitioned in the geometric partitioning mode of a decoding target block is the intra prediction mode, in a case where a first internal parameter that controls applicability of the geometric partitioning mode of the decoding target block is valid, a value of the second syntax is 1, and a third syntax that specifies whether or not a prediction mode of a partitioned region 0 partitioned in the geometric partitioning mode of the decoding target block is the intra prediction mode is valid;
    decode the fourth syntax, in a case where the first internal parameter is valid, the value of the second syntax is 1, the third syntax is not valid, and a slice type to which the decoding target block belongs is a B-slice;
    not decode the fourth syntax, in a case where the first internal parameter is valid, the value of the second syntax is 1, the third syntax is not valid, and the slice type is not the B-slice; and
    not decode the fourth syntax, in a case where the first internal parameter is not valid, or the value of the second syntax is not 1.

2. An image decoding method comprising:
    decoding a first syntax that controls applicability of a geometric partitioning mode of a decoding target sequence;
    controlling, in accordance with a value of the first syntax, whether or not to decode a second syntax that controls applicability of an intra prediction mode to the geometric partitioning mode of the decoding target sequence;
    not decoding a fourth syntax that specifies whether or not a prediction mode of a partitioned region 1 partitioned in the geometric partitioning mode of a decoding target block is the intra prediction mode, in a case where a first internal parameter that controls applicability of the geometric partitioning mode of the decoding target block is valid, a value of the second syntax is 1, and a third syntax that specifies whether or not a prediction mode of a partitioned region 0 partitioned in the geometric partitioning mode of the decoding target block is the intra prediction mode is valid;
    decoding the fourth syntax, in a case where the first internal parameter is valid, the value of the second syntax is 1, the third syntax is not valid, and a slice type to which the decoding target block belongs is a B-slice;
    not decoding the fourth syntax, in a case where the first internal parameter is valid, the value of the second syntax is 1, the third syntax is not valid, and the slice type is not the B-slice; and
    not decoding the fourth syntax, in a case where the first internal parameter is not valid, or the value of the second syntax is not 1.

3. A non-transitory computer-readable medium storing a program thereon for controlling a computer to function as an image decoding device, the computer comprising a circuit, and the program being executable to control the computer to execute processes comprising:
    decoding a first syntax that controls applicability of a geometric partitioning mode of a decoding target sequence;
    controlling, in accordance with a value of the first syntax, whether or not to decode a second syntax that controls applicability of an intra prediction mode to the geometric partitioning mode of the decoding target sequence;
    not decoding a fourth syntax that specifies whether or not a prediction mode of a partitioned region 1 partitioned in the geometric partitioning mode of a decoding target block is the intra prediction mode, in a case where a first internal parameter that controls applicability of the geometric partitioning mode of the decoding target block is valid, a value of the second syntax is 1, and a third syntax that specifies whether or not a prediction mode of a partitioned region 0 partitioned in the geometric partitioning mode of the decoding target block is the intra prediction mode is valid;

decoding the fourth syntax, in a case where the first internal parameter is valid, the value of the second syntax is 1, the third syntax is not valid, and a slice type to which the decoding target block belongs is a B-slice;

not decoding the fourth syntax, in a case where the first internal parameter is valid, the value of the second syntax is 1, the third syntax is not valid, and the slice type is not the B-slice; and not decoding the fourth syntax, in a case where the first internal parameter is not valid, or the value of the second syntax is not 1.

* * * * *